(12) United States Patent
Greenwood et al.

(10) Patent No.: US 8,378,265 B2
(45) Date of Patent: Feb. 19, 2013

(54) CONVECTION OVEN

(75) Inventors: Jack Greenwood, Wentzville, MO (US);
Robert J. Reese, Edwardsville, IL (US)

(73) Assignee: Duke Manufacturing Co., St. Louis, MO (US)

( * ) Notice: Subject to any disclaimer, the term of this patent is extended or adjusted under 35 U.S.C. 154(b) by 0 days.

(21) Appl. No.: 12/841,393

(22) Filed: Jul. 22, 2010

(65) Prior Publication Data
US 2010/0301034 A1    Dec. 2, 2010

Related U.S. Application Data

(63) Continuation of application No. PCT/US2009/032251, filed on Jan. 28, 2009.

(60) Provisional application No. 61/024,095, filed on Jan. 28, 2008.

(51) Int. Cl.
*A21B 1/00* (2006.01)
*A21B 1/26* (2006.01)
*F27D 19/00* (2006.01)
*F24C 15/00* (2006.01)

(52) U.S. Cl. ........ 219/391; 219/400; 219/414; 219/507; 126/21 A; 126/273 R

(58) Field of Classification Search .................. None
See application file for complete search history.

(56) References Cited

U.S. PATENT DOCUMENTS

| | | | |
|---|---|---|---|
| 2,453,832 A * | 11/1948 | Dadson | 174/543 |
| 3,210,005 A | 10/1965 | Arnold | |
| 3,251,358 A | 5/1966 | Short et al. | |
| 3,289,742 A | 12/1966 | Niemann | |
| 3,443,633 A | 5/1969 | Carnavos | |
| 3,513,669 A * | 5/1970 | Nirenberg | 68/5 C |
| 3,556,204 A | 1/1971 | Dehne | |
| 3,967,164 A | 6/1976 | Valle | |
| 4,250,865 A * | 2/1981 | Scherer | 126/41 D |
| 4,281,636 A * | 8/1981 | Vegh et al. | 126/369 |
| 4,324,052 A | 4/1982 | Bosher | |
| 4,327,271 A * | 4/1982 | Bentley et al. | 219/85.17 |
| 4,450,899 A | 5/1984 | Jakobsson et al. | |

(Continued)

FOREIGN PATENT DOCUMENTS

| | | |
|---|---|---|
| CA | 2409538 A1 | 8/2003 |
| DE | 3234042 A1 * | 3/1984 |

(Continued)

OTHER PUBLICATIONS

Unknown, "Cadco Convection Ovens," printed Jan. 16, 2008, 5 pages, Dvorson's Food Service Equipment, Inc.

(Continued)

*Primary Examiner* — Joseph M Pelham
(74) *Attorney, Agent, or Firm* — Senniger Powers LLP

(57) ABSTRACT

A convection oven having a vapor collection system; water injection system; easily accessible electrical components; and a variable-speed, reversible blower is disclosed. The vapor collection system collects vapor from the cooking chamber during a cooking event, condenses the vapor, and drains the condensed vapor. The water injection system injects water for impact against a blower wheel for dispersion into the air circulating through the cooking chamber. The electrical components are housed within a housing that in a closed position conceals the components and in a closed position exposes the components for easy access. The rotational speed and direction of the variable-speed, reversible blower is controlled during a cooking event according to predetermined speed curves which may include one or more reversal events to achieve more uniform cooking of food. A main controller is programmable via an operator input (e.g., liquid crystal display touch screen) to control operating parameters of the oven.

20 Claims, 44 Drawing Sheets

U.S. PATENT DOCUMENTS

| | | | |
|---|---|---|---|
| 4,587,946 A * | 5/1986 | Doyon et al. | 126/20 |
| 4,698,487 A | 10/1987 | Meister | |
| 4,700,685 A * | 10/1987 | Miller | 126/20 |
| 4,800,806 A | 1/1989 | Durth | |
| 4,835,368 A | 5/1989 | Fortmann et al. | |
| 4,891,498 A | 1/1990 | Fortmann et al. | |
| 4,909,309 A | 3/1990 | Palvalvi et al. | |
| 5,014,679 A | 5/1991 | Childs et al. | |
| 5,025,132 A | 6/1991 | Fortmann et al. | |
| 5,172,682 A | 12/1992 | Luebke et al. | |
| 5,209,941 A | 5/1993 | Wuest | |
| 5,286,942 A | 2/1994 | McFadden et al. | |
| 5,301,652 A | 4/1994 | Willis et al. | |
| 5,375,921 A | 12/1994 | Tupa et al. | |
| 5,442,994 A | 8/1995 | Parker et al. | |
| 5,499,577 A | 3/1996 | Tommasini | |
| 5,517,980 A | 5/1996 | Cappello et al. | |
| 5,530,223 A | 6/1996 | Culzoni et al. | |
| 5,552,578 A | 9/1996 | Violi | |
| 5,619,983 A | 4/1997 | Smith | |
| 5,636,622 A | 6/1997 | Urcelay Amondarain et al. | |
| 5,694,835 A | 12/1997 | Mangina | |
| 5,726,424 A * | 3/1998 | Koether | 219/414 |
| 5,738,424 A * | 4/1998 | Katz et al. | 312/293.3 |
| 5,762,985 A | 6/1998 | Eisele | |
| 5,768,982 A | 6/1998 | Violi et al. | |
| 5,864,120 A * | 1/1999 | Vroom et al. | 219/400 |
| 5,913,967 A | 6/1999 | Eisele | |
| 5,934,178 A | 8/1999 | Caridis et al. | |
| 5,968,574 A | 10/1999 | Sann | |
| 5,996,474 A | 12/1999 | Collas et al. | |
| 6,023,050 A | 2/2000 | Violi | |
| 6,146,678 A | 11/2000 | Caridis et al. | |
| 6,188,045 B1 | 2/2001 | Hansen et al. | |
| 6,257,128 B1 | 7/2001 | Chen | |
| 6,262,406 B1 | 7/2001 | McKee et al. | |
| 6,267,045 B1 | 7/2001 | Wiedemann et al. | |
| 6,318,246 B2 | 11/2001 | Fukushima et al. | |
| 6,342,262 B1 | 1/2002 | Wuest | |
| 6,405,639 B1 | 6/2002 | Lee et al. | |
| 6,410,890 B1 | 6/2002 | Kohlstrung | |
| 6,465,762 B1 | 10/2002 | Swayne et al. | |
| 6,555,791 B2 | 4/2003 | Lubrina et al. | |
| 6,730,880 B2 | 5/2004 | Smith et al. | |
| 6,772,751 B2 * | 8/2004 | Deuringer et al. | 126/20 |
| 6,805,112 B2 | 10/2004 | Cole et al. | |
| 6,919,546 B2 * | 7/2005 | Lee | 219/702 |
| 6,987,246 B2 | 1/2006 | Hansen et al. | |
| 7,044,122 B2 | 5/2006 | Personnettaz et al. | |
| 7,100,596 B2 | 9/2006 | Violi | |
| 7,143,761 B2 | 12/2006 | Hwang | |
| 7,157,668 B2 | 1/2007 | Bartelick | |
| 7,192,272 B2 | 3/2007 | Jones et al. | |
| 7,258,881 B2 | 8/2007 | Jones et al. | |
| 7,282,674 B2 | 10/2007 | Hansen et al. | |
| 7,307,244 B2 | 12/2007 | Hansen et al. | |
| 7,317,173 B2 | 1/2008 | Bartelick et al. | |
| 7,325,480 B2 | 2/2008 | Gruhbaum et al. | |
| 7,325,481 B2 | 2/2008 | Helm | |
| 7,341,055 B2 | 3/2008 | Hwang | |
| 7,435,932 B2 * | 10/2008 | Jung | 219/702 |
| 7,634,992 B2 | 12/2009 | Bujeau et al. | |
| 7,677,161 B2 | 3/2010 | Matsuo et al. | |
| 7,709,769 B2 | 5/2010 | Ando et al. | |
| 7,728,261 B2 | 6/2010 | Helm | |
| 7,759,615 B2 | 7/2010 | Ando et al. | |
| 7,762,250 B2 * | 7/2010 | Elkasevic et al. | 126/198 |
| 7,795,561 B2 | 9/2010 | Ando et al. | |
| 2002/0179588 A1 * | 12/2002 | Lubrina et al. | 219/400 |
| 2007/0012307 A1 * | 1/2007 | Wiker et al. | 126/21 A |
| 2007/0093091 A1 * | 4/2007 | Jung | 439/79 |
| 2007/0187388 A1 | 8/2007 | Yamaguchi et al. | |
| 2008/0078371 A1 * | 4/2008 | Boscaino | 126/20 |
| 2008/0237213 A1 | 10/2008 | Bujeau et al. | |
| 2008/0307978 A1 | 12/2008 | Bassoli | |
| 2009/0007797 A1 | 1/2009 | Ando et al. | |
| 2009/0007798 A1 | 1/2009 | Yamaguchi et al. | |
| 2009/0075224 A1 * | 3/2009 | Wiker et al. | 432/8 |
| 2010/0193496 A1 * | 8/2010 | Jung et al. | 219/209 |

FOREIGN PATENT DOCUMENTS

| | | |
|---|---|---|
| DE | 20317601 A1 | 1/2005 |
| EP | 1310742 A2 | 5/2003 |
| EP | 0959305 B1 | 8/2004 |
| EP | 1535549 A1 | 6/2005 |
| EP | 1715253 A2 | 10/2006 |
| EP | 1721525 A2 | 11/2006 |
| GB | 2112127 A | 7/1983 |
| JP | 05231646 A * | 9/1993 |
| WO | 9749320 A1 | 1/2012 |

OTHER PUBLICATIONS

Unknown, "Cadco Unox Line Chef Manual Countertop Convection Oven," Jun. 20, 2007, 1 page, Cadco, Ltd.

Unknown, "Electric Convection Ovens," catalog, printed Jan. 16, 2008, 17 pages, Restaurantequipment.com.

Unknown, "Welcome to Moffat," product brochure, printed Jan. 18, 2008, 1 page, Moffat, Ltd.

Unknown, "Turbofan Bake Off System," product brochure, 2 pages, Moffat, Ltd.

Unknown, "Moffat," product brochure, printed Jan. 18, 2008, 2 pages, Moffat, Ltd.

Unknown, "LineMiss Convection Humidity Ovens," product brochure, printed Jan. 18, 2008, 3 pages, Unox S.p.A.

International Search Report for PCT/US2009/032251 dated Apr. 20, 2009, 3 pages.

Written Opinion for PCT/US2009/032251 dated Apr. 20, 2009, 11 pages.

European Search Report for EP09707031.2 dated Nov. 23, 2011, 7 pages.

* cited by examiner

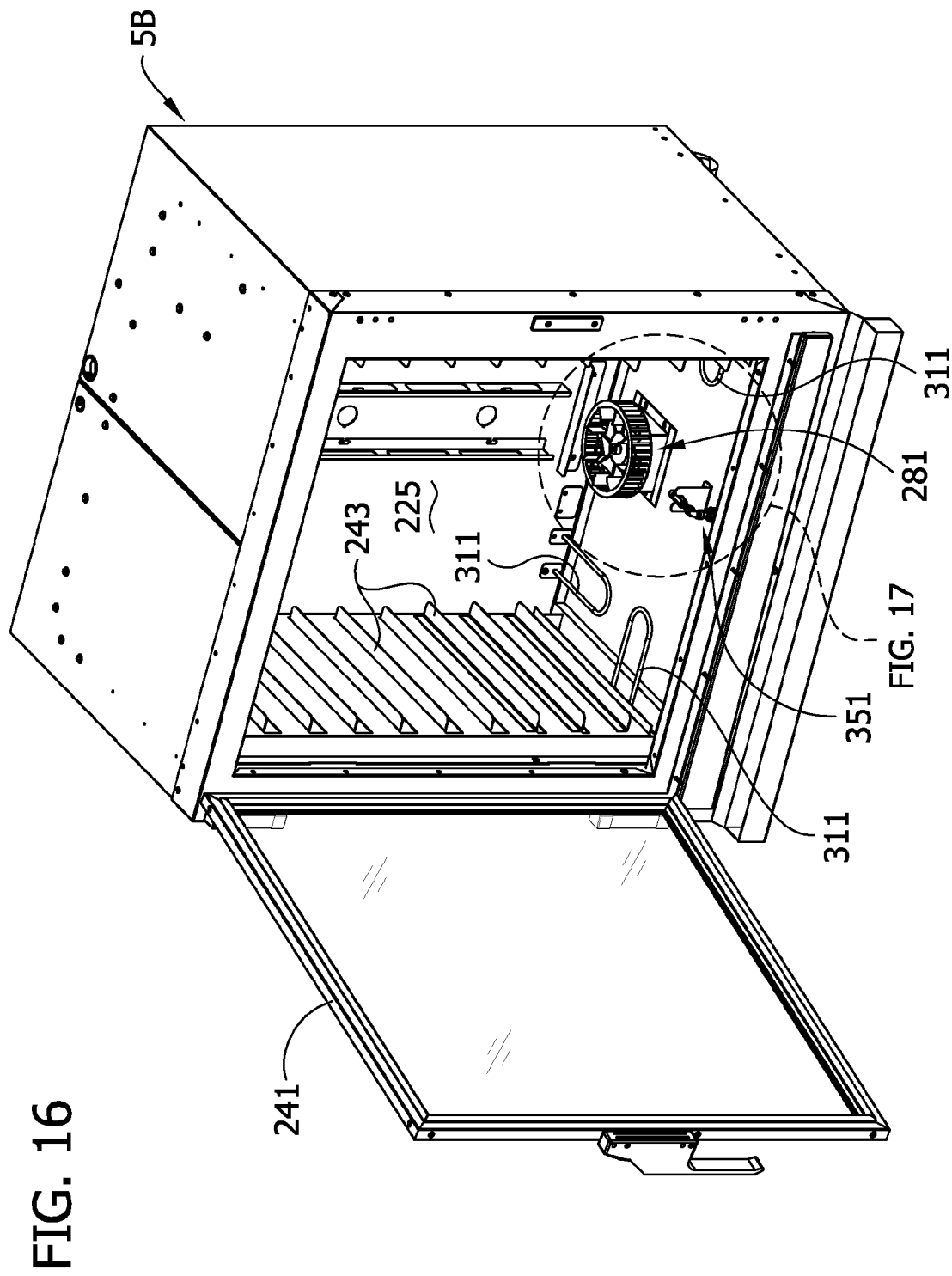

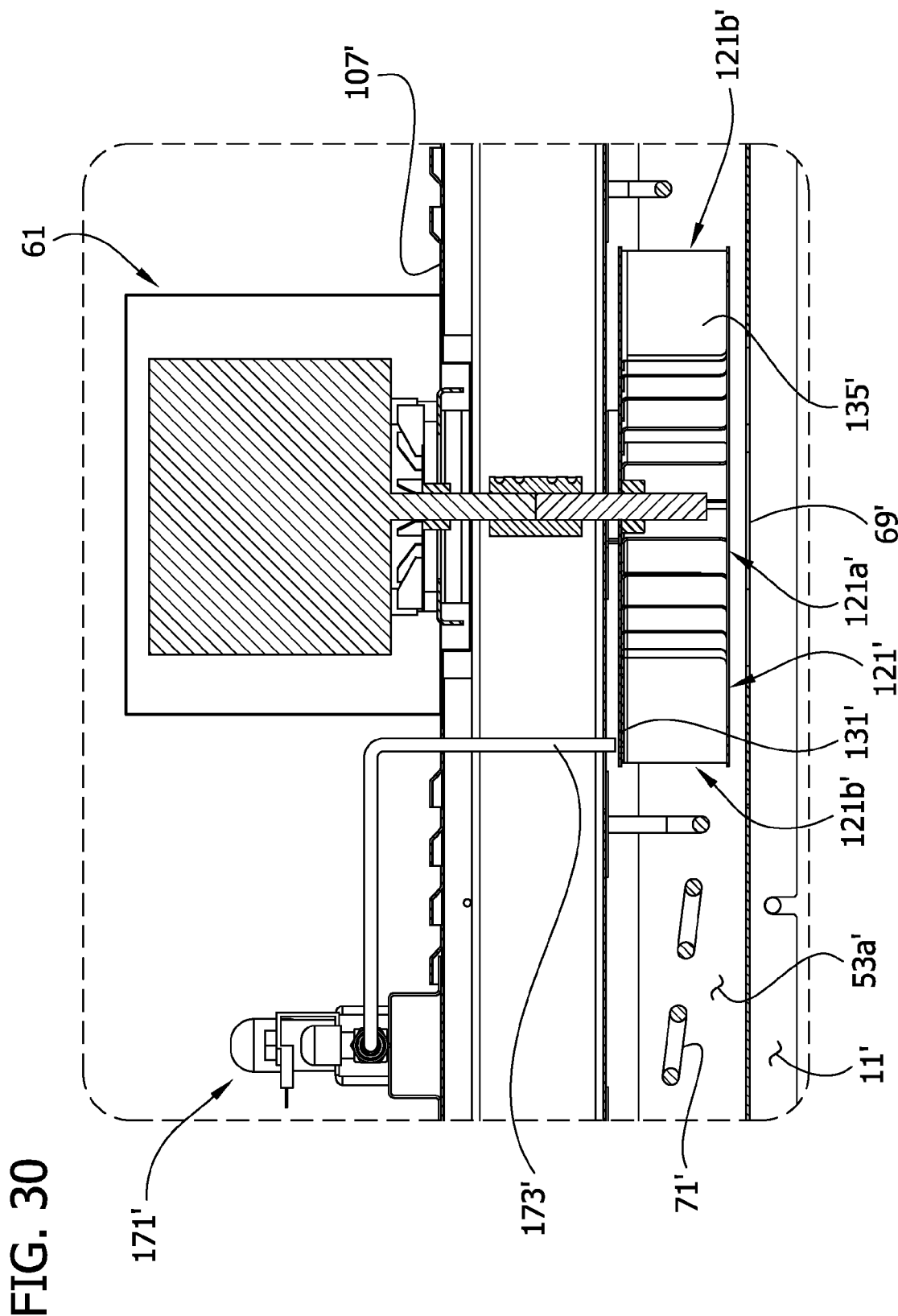

CONVECTION OVEN

CROSS-REFERENCE TO RELATED CASES

This application is a continuation application claiming priority from PCT Patent Application No. PCT/US2009/032251, filed Jan. 28, 2009 which claims priority to U.S. Patent Application No. 61/024,095 (provisional), filed Jan. 28, 2008, which is hereby incorporated by reference in its entirety.

FIELD OF THE INVENTION

The present invention generally relates to ovens and more particularly to a forced-air convection oven for baking bread products, among other things.

BACKGROUND OF THE INVENTION

Certain types of food products are especially difficult to cook quickly and uniformly. Bread is one such product. For proper cooking, the inside of the dough needs to be completely baked while the crust uniformly browns to the desired color. Conventional bread-baking ovens have various drawbacks.

For example, conventional ovens do not provide convenient access to electrical components of the ovens for servicing or other purposes. Typically, a control panel or other part must be disassembled to access electrical parts. Further, once disassembly enables access to the electrical components, the components are not mounted within the oven in a position or orientation for convenient servicing. Thus, there exists a need for an oven that provides convenient access to electrical components of the oven having the components mounted in a position and an orientation conducive to servicing of the components.

Another drawback of known ovens is that steam formed during the baking process is not disposed of in a desirable or efficient manner. Some ovens simply expel the steam into the atmosphere surrounding the oven (e.g., inside the baking room or restaurant). Other ovens expel the steam through an exhaust that leads to the outside atmosphere. Some ovens provide a self-contained steam condensing system, but a more efficient self-contained system is needed.

Drawbacks also exist in the steam generation systems used to inject water against heated rotating blower wheels to generate steam for the cooking process in existing ovens. For example, some water injection systems involve atomizers having complex designs in combination with the blower wheel to atomize injected water. Other water injection systems are simpler, but result in less efficient generation of steam. Further, in some water injection systems, some of the injected water does not turn to steam and subsequently contacts the product to be cooked (e.g., bread), undesirably affecting the cooking process. Thus, a simplified, more efficient water injection system is needed.

Finally, conventional convection ovens incorporate various types of systems for circulating hot gas (e.g., air) throughout the cooking chamber, including systems having a reversible, variable speed fan. However, such systems often fail to achieve uniform cooking of food in the cooking chamber.

There is a need, therefore, for an improved oven which meets one or more of the above needs.

SUMMARY OF THE INVENTION

One aspect of the present invention is directed to a convection oven comprising a cooking chamber for receiving food to be cooked, a blower for circulating gas (e.g., air) through the cooking chamber, a heater for heating the gas, and a housing for housing electrical components of the oven. The housing comprises front, back and side walls. The front wall is movable from a first position in which the electrical components are concealed within the housing to a second position in which the electrical components are exposed. The electrical components are mounted within the housing at positions relative to the front wall such that the electrical components may be conveniently accessed by an operator when the front wall is in the second position. An operator input is provided on the front wall of the housing for inputting information to the electrical control components.

In another aspect, the oven comprises a cooking chamber for receiving food to be cooked, a blower for circulating gas (e.g., air) through the cooking chamber, and a heater for heating the gas. The oven also includes a vapor collection system for collecting vapor from the cooking chamber during a cooking event. The vapor collection system comprises a condensing device above the cooking chamber having an inlet communicating with the chamber for receiving vapor and an outlet for draining condensed vapor. The condensing device comprises a coil comprising a plurality of turns configured for gravity feeding condensate to the outlet.

In another aspect, the oven comprises a cooking chamber for receiving food to be cooked, a variable-speed, reversible blower for circulating gas (e.g., air) through the cooking chamber, the blower being operable at more than two speeds when activated, and a heater for heating the gas. The oven also includes a control system comprising an operator input and a controller responsive to the operator input for controlling the rotational speed of the blower during the cooking event according to a predetermined speed curve which includes at least two reversal events. Each reversal event comprises a deceleration of the blower as it rotates in one direction from a first rotational speed on said speed curve to a zero rotational speed, followed by an acceleration of the blower as it rotates in an opposite direction from zero speed to a second rotational speed on said speed curve, the second speed being either the same as or different from said first speed. In one embodiment, the shape of the speed curve is substantially non-linear between the end of one reversal event and the beginning of another reversal event.

In another aspect, the oven comprises a cooking chamber for receiving food to be cooked, a variable-speed, reversible blower for circulating gas (e.g., air) through the cooking chamber, the blower being operable at more than two speeds when activated, and a heater for heating the gas. The oven includes a control system comprising an operator input and a controller responsive to the operator input for controlling the rotational speed of the blower during the cooking event according to a predetermined speed curve. In one embodiment, the speed curve has no substantial linear components.

The invention is also directed to a method of cooking food in a convection oven comprising a cooking chamber for receiving food to be cooked. The method comprising the steps of placing food in the cooking chamber, and operating a blower of the oven to circulate heated gas (e.g., air) through the cooking chamber to cook the food during a cooking event. The operating step comprises controlling the rotational speed of the blower during the cooking event according to a predetermined speed curve which includes at least two reversal events. Each reversal event comprises a deceleration of the blower as it rotates in one direction from a first rotational speed on the speed curve to a zero rotational speed, followed by an acceleration of the blower as it rotates in an opposite direction from zero speed to a second rotational speed on the speed curve, the second speed being either the same as or different from said first speed. In one embodiment, the shape of the speed curve is substantially non-linear between the end of one reversal event and the beginning of another reversal event.

Other objects and features will be in part apparent and in part pointed out hereinafter.

BRIEF DESCRIPTION OF THE DRAWINGS

FIG. 16 is a perspective similar to FIG. 13 but with the door open and the bottom wall of the cooking chamber removed to show details;

FIG. 30 is a view similar to FIG. 3 showing an enlarged portion of another embodiment of a blower and water injection system;

Corresponding reference characters indicate corresponding parts throughout the drawings.

DESCRIPTION OF THE PREFERRED EMBODIMENTS

Figure 1:
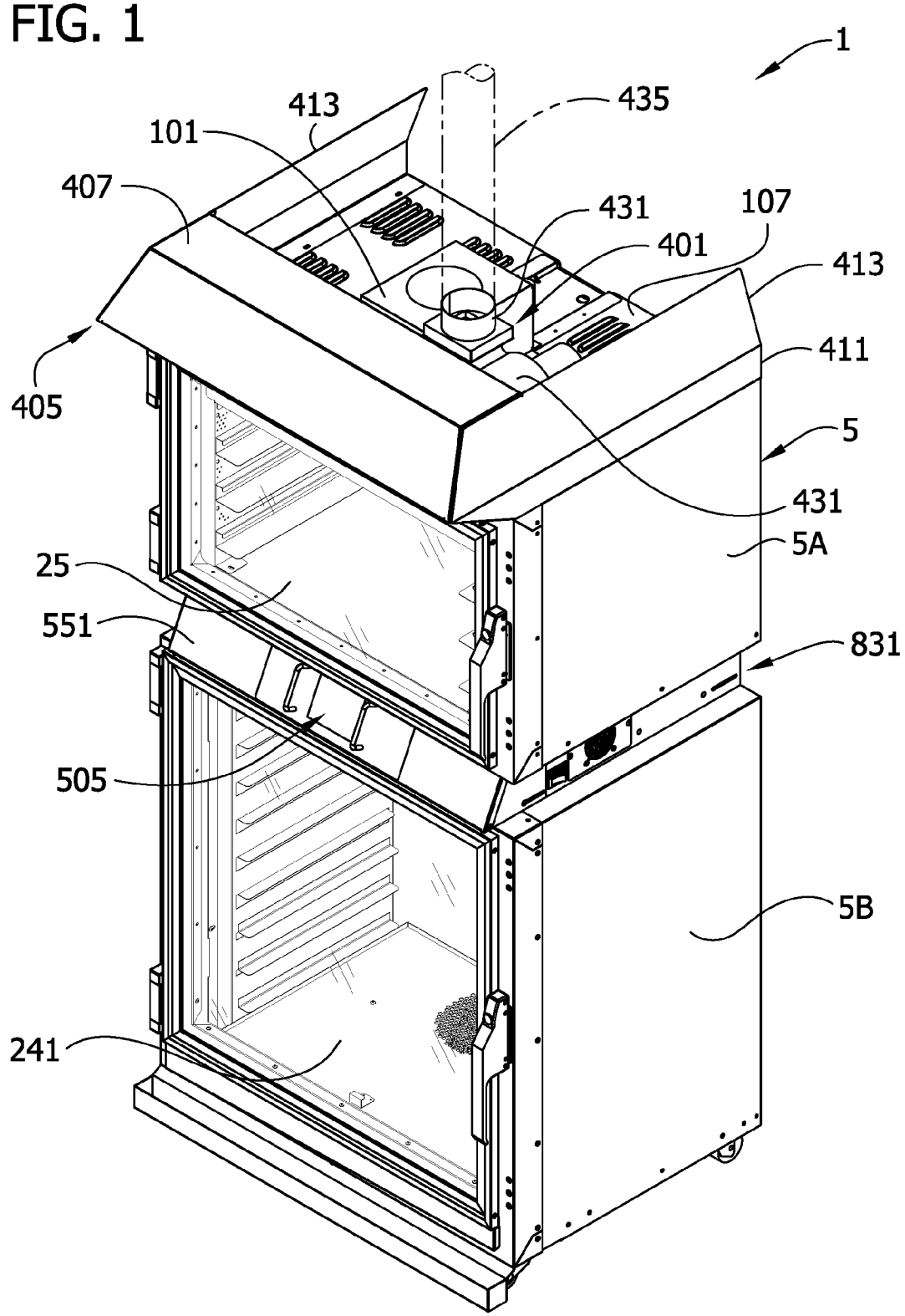
FIG. 1 is a perspective view of one embodiment of an oven of this invention.

Referring to the drawings, FIG. 1 illustrates one embodiment of an oven of this invention, indicated generally by the reference number 1. The oven is adapted for cooking and baking products such as bread, among other things, and includes a cabinet, generally designated 5, having an upper section 5A and a lower section 5B. If the oven 1 is used in a bread making process, the dough is first proofed in the lower section 5B of the oven and then baked in the upper section 5A. (As will be understood by those skilled in the bread-making field, "proofing" is a continuation of the process of yeast fermentation which increases the volume or "rise" of the shaped dough, and an oven used to "proof" bread is often referred to as a "proofer" or "proofer oven.")

Figure 2:
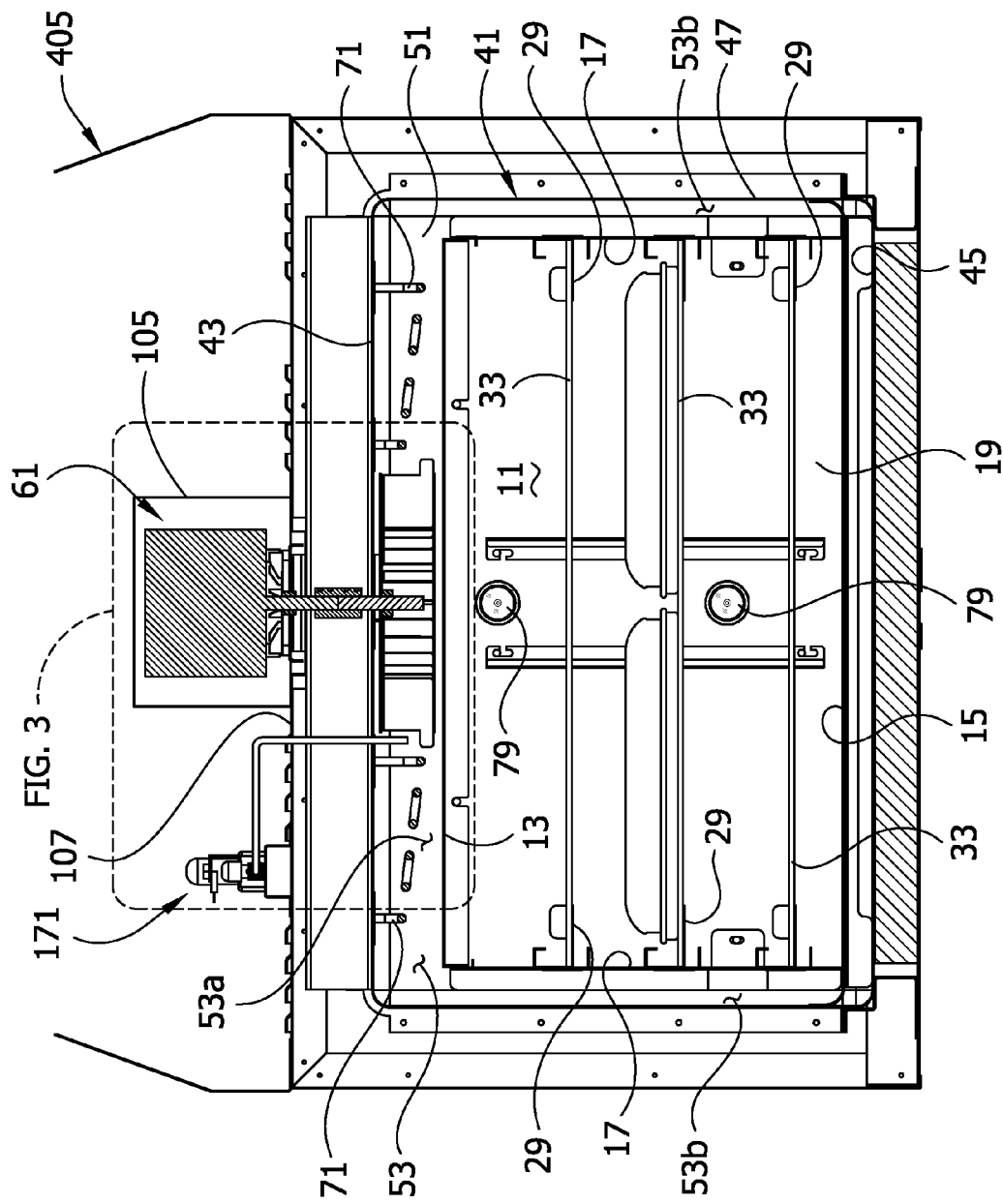
FIG. 2 is a front elevation of the upper section of the oven of FIG. 1, shown partially in section.
Figure 3:
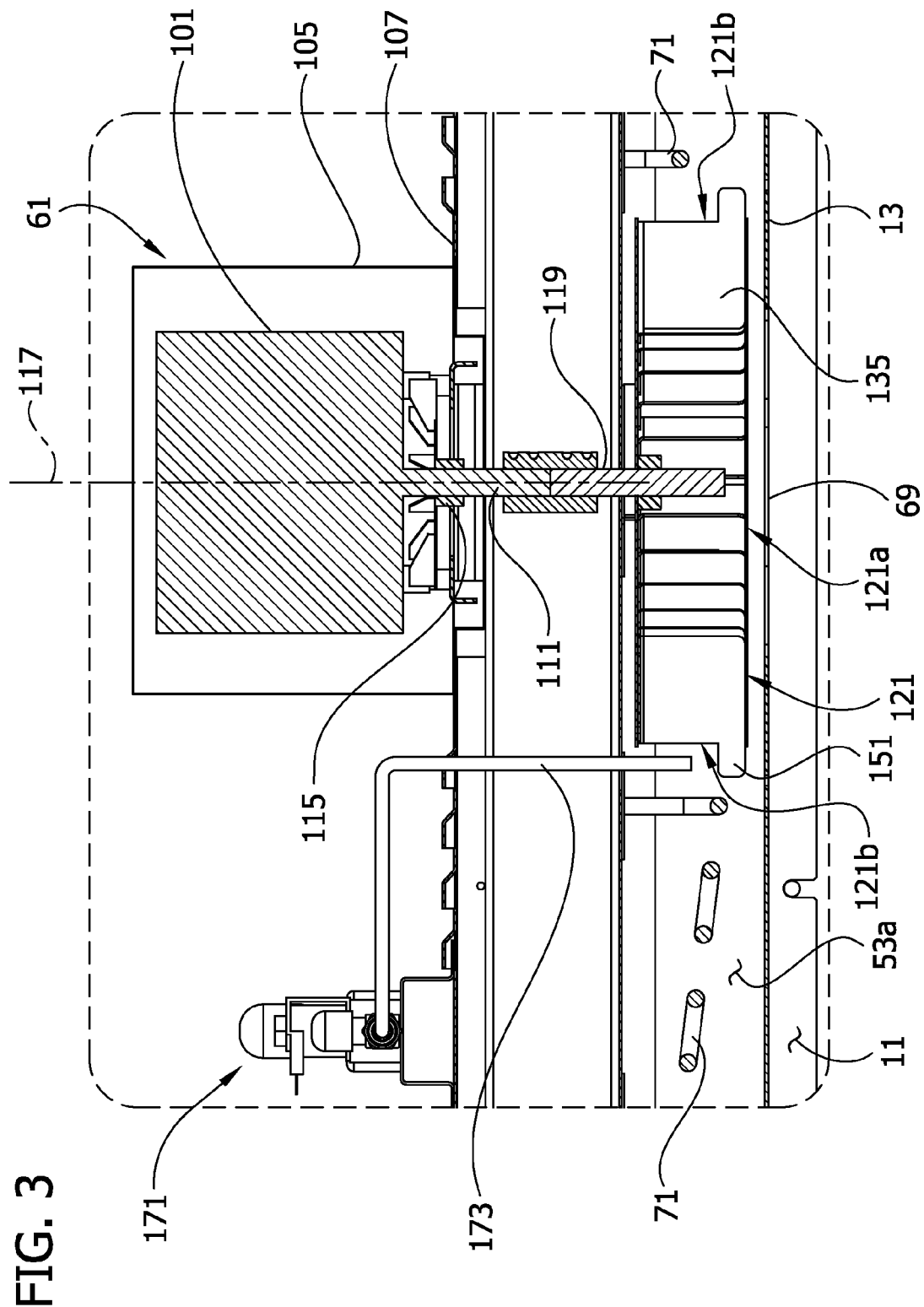
FIG. 3 is an enlarged portion of FIG. 2 showing blower details.

Referring to FIGS. 1-3, the upper section 5A of the oven 5 comprises a cooking (e.g., baking) chamber 11 defined by a top wall 13, a bottom wall 15, opposite side walls 17, and a back wall 21. The chamber 11 is accessible by opening a door 25 which closes the front of the chamber. One or more rack supports 29 are secured to the walls of the chamber for supporting a number of food racks 33 in the chamber, three such racks being shown in FIG. 2. Each rack is sized to hold a number of pans of bread dough. It will be understood that the number and size of the racks 33 can vary without departing from the scope of this invention. The cooking chamber 11 is surrounded by an upper housing, generally designated 41 in FIG. 2, having a top wall 43, a bottom wall 45, opposite side walls 47 and a back wall 51. The top and side walls of the housing 41 are spaced from respective walls of the cooking chamber 11 to provide a conduit system or flow path 53 for circulating heated air (or other gas) to, through and from the cooking chamber 11. As shown in FIG. 2, the conduit system 53 comprises an upper portion 53a above the cooking chamber 11 and side portions 53b at opposite sides of the cooking chamber 11. Other flow path configurations may be used.

A blower, generally indicated at 61 in FIG. 2, is mounted in the upper portion 53a of the conduit system 53, adjacent the top of the upper section 5A of the oven, for circulating air (or other gas) through the conduit system. In the illustrated embodiment, air enters the cooking chamber 11 through a plurality of entry openings 65 in the side walls 17 of the chamber (FIGS. 4 and 5) and exits the chamber through an exhaust opening 69 in the top wall 13 of the chamber. A heater 71 is provided for heating the air being circulated. By way of example, the heater may comprise one or more electric resistance heating elements in the upper portion 53a of the conduit system 53 located adjacent the top wall 13 of the cooking chamber 11. The heater 71 heats the air as it leaves the chamber before it is re-circulated back to the chamber via the conduit system. One or more temperature sensors 75 (FIG. 23) are provided in the cooking chamber 11 for sensing the temperature in the chamber and providing feedback to the control system of the oven. In one embodiment, two temperature sensors 75A, 75B are provided for sensing temperature in different zones of the cooking chamber 11. The cooking chamber is illuminated by lights 79 mounted on the back wall of the chamber 11.

Figure 4:
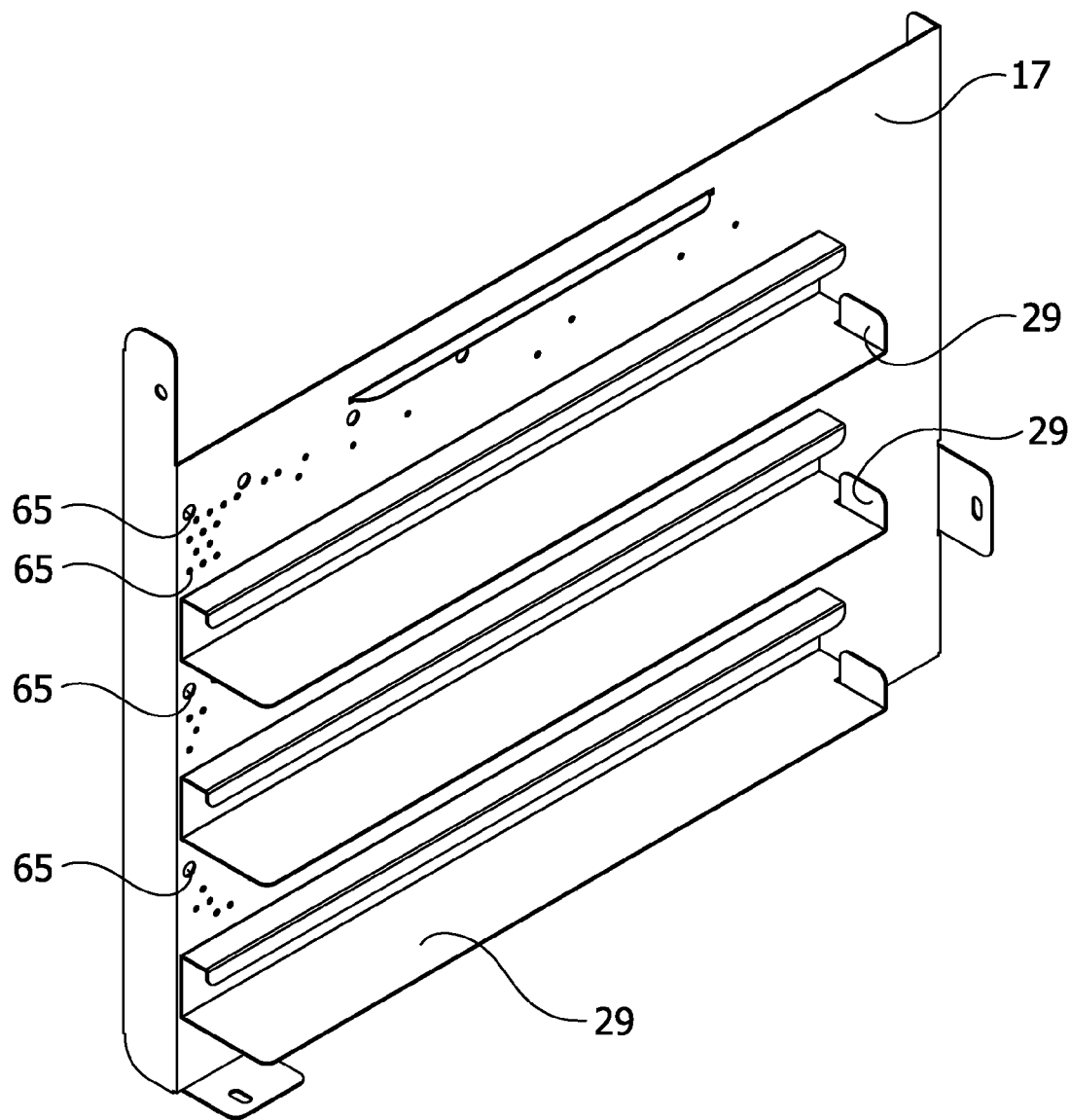
FIG. 4 is a perspective a side wall of the cooking chamber of the upper section of the oven.
Figure 5:
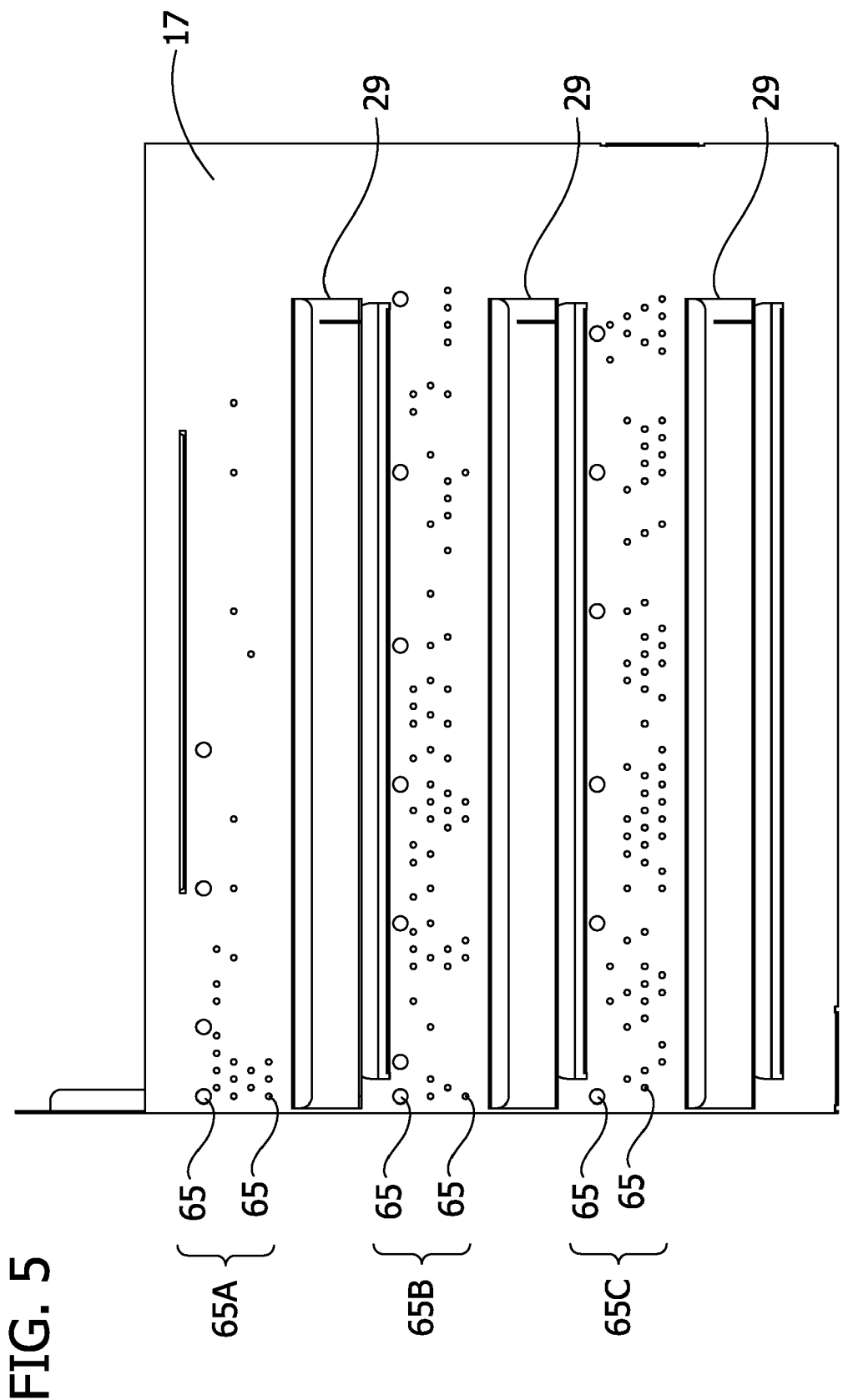
FIG. 5 is an elevation of the side wall of FIG. 4.

Referring to FIGS. 4 and 5, the entry openings 65 in the side walls 17 of the cooking chamber 11 are sized and configured for directing heated air to the food on each rack in the chamber. In general, the number and/or size of the openings 65 (i.e., the overall air flow area) associated with each rack level increases from the top of the cooking chamber toward the bottom of the chamber to insure that substantially the same volume of air is provided to each level of food on the chamber. (Without such an increase in flow area, more heated air would enter the chamber at the upper levels than the lower levels.) The entry openings 65 are also configured in shape, size and location to achieve the desired baking characteristics.

In the particular configuration of FIG. 5, the openings 65 comprise three distinct patterns, namely, an upper pattern 65A for delivering heated air to food on the upper rack 33; an intermediate pattern 65B for delivering heated air to food on the middle or intermediate rack 33; and a lower pattern 65C for delivering heated air to food on the lower rack 33. As shown, the upper pattern 65A comprises a first plurality of relatively large holes (e.g., 0.312 in.-diameter circular holes) aligned in a horizontal row above the upper rack for directing heated air toward upper portions of the food on the rack, and a first plurality of smaller holes (e.g., 0.125 in.-diameter circular holes) below the larger holes arranged for directing heat toward middle and lower portions of the food on the upper rack. The intermediate pattern 65B comprises a second plurality of relatively large holes (e.g., 0.312 in.-diameter circular holes) aligned in a horizontal row above the intermediate rack for directing heated air toward upper portions of the food on the rack, and a second plurality of smaller holes (e.g., 0.125 in.-diameter circular holes) below the larger holes arranged for directing heat toward middle and lower portions of the food on the intermediate rack. The lower pattern 65C comprises a third plurality of relatively large holes (e.g., 0.312 in.-diameter circular holes) aligned in a horizontal row above the upper rack for directing heated air toward upper portions of the food on the rack, and a third plurality of smaller holes (e.g., 0.125 in.-diameter circular holes) below the larger holes arranged for directing heat toward middle and lower portions of the food on the lower rack. It will be observed that the number and location of holes vary from pattern to pattern. In general, the arrangement is such that the overall or total flow area of the openings of the first pattern 65A of holes is less than the overall or total flow area of the holes in the second pattern 65B, and the overall or total flow area of holes of the second pattern is less than the overall or total flow area of the holes in the third pattern 65C to provide a more uniform distribution of air to the different levels. The specific configuration (size, shape and locations) of the holes in the various patterns will vary according to the size and shape of the food product in the cooking chamber and according to the desired qualities of the food after it has finished baking. By way of example but not limitation, the openings may be circular holes varying in diameter from 0.060 in. to 1.00 in., or they may be slots having rounded ends with a size that can range from 0.060 in. wide by 0.50 in. long to 0.38 in. wide by 1.5 in. long.

Figure 6:
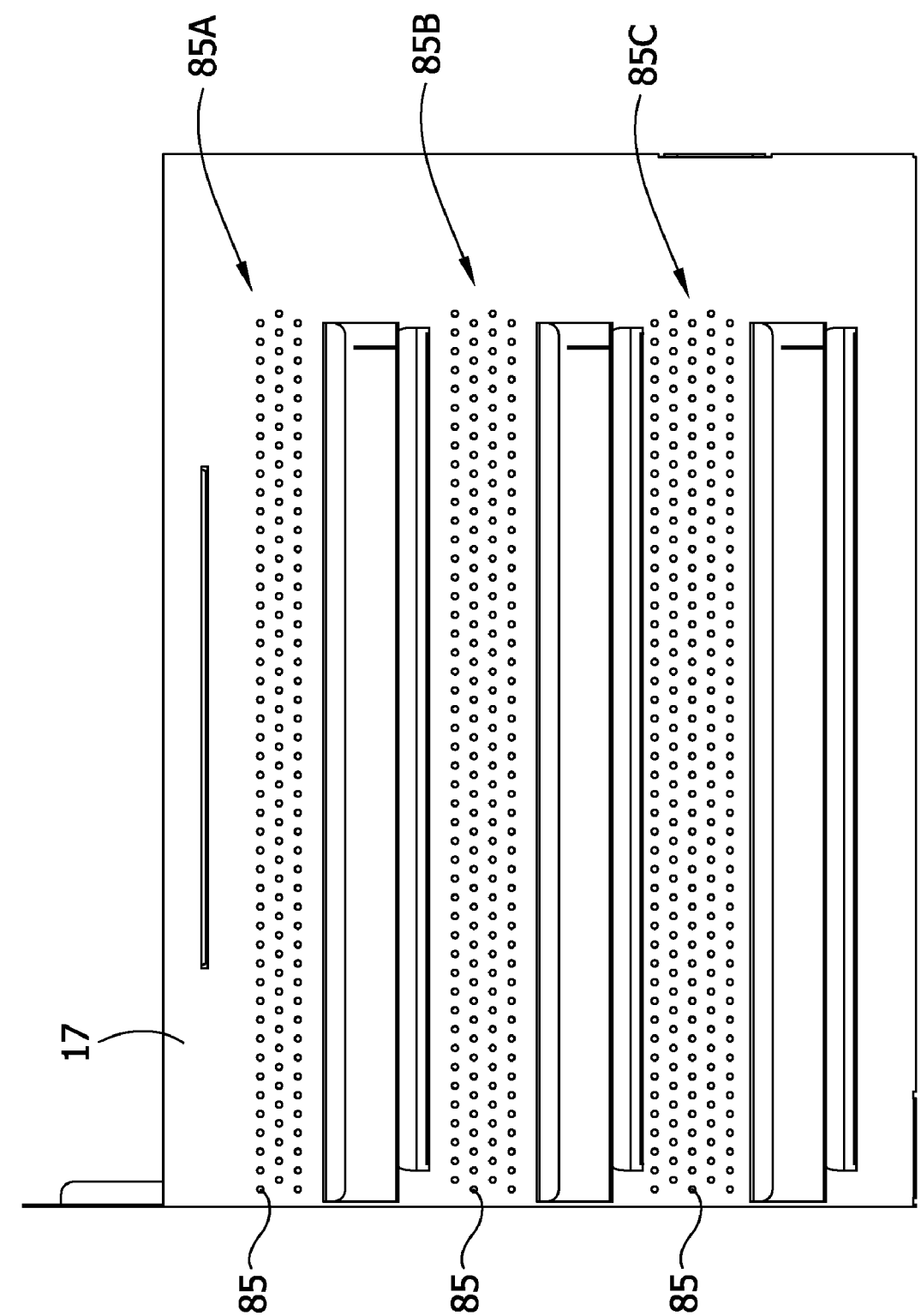
FIGS. 6 and 7 show alternative hole patterns in the side wall of FIGS. 4 and 5.
Figure 7:
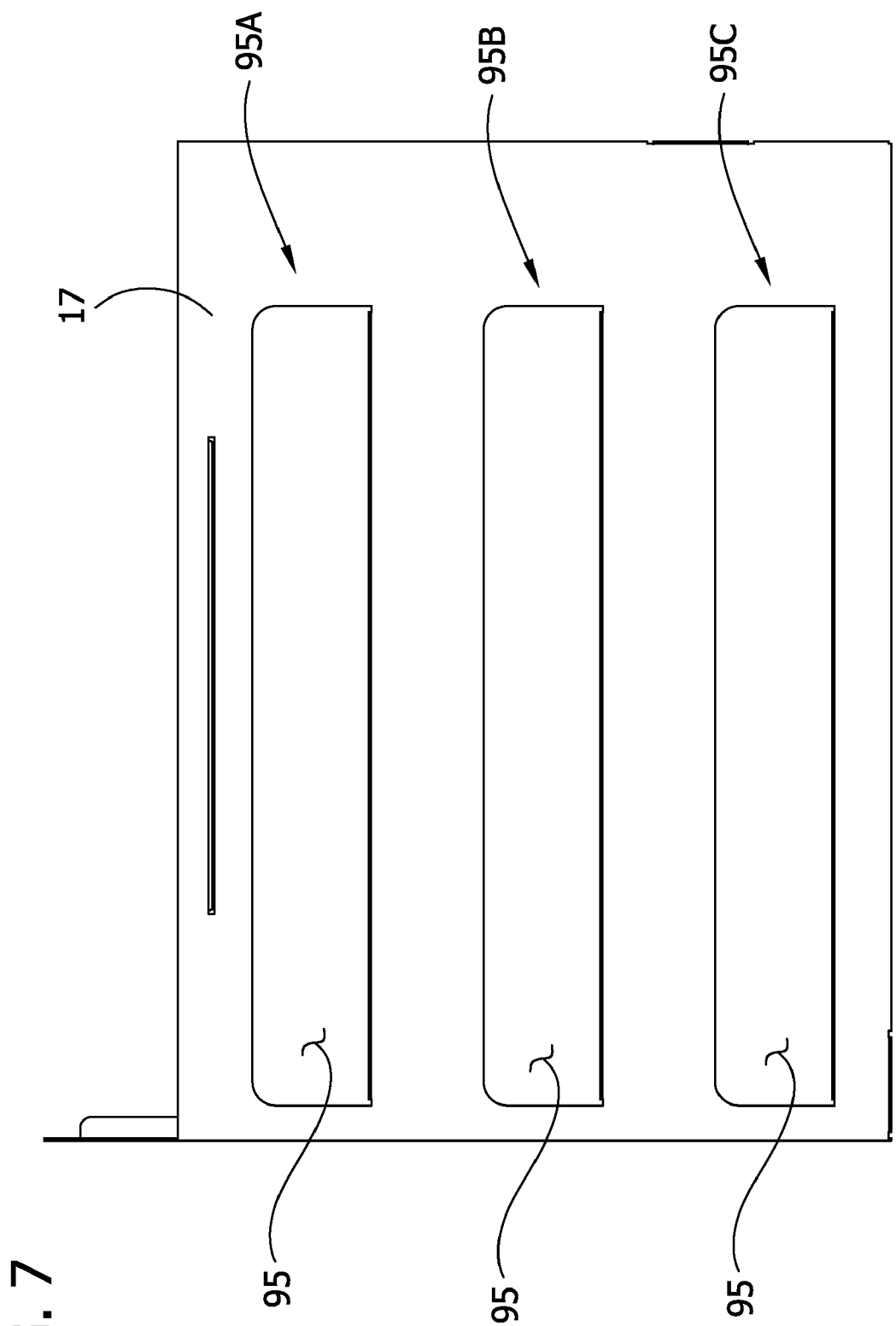

FIGS. 6 and 7 illustrate different entry opening configurations. In FIG. 6, the entry openings 85 of each pattern 85A, 85B and 85C are all of the same size and are arranged in a generally rectangular matrix of regularly spaced openings extending alongside the food on the racks. By way of example but not limitation, the openings may be circular holes varying in diameter from 0.060 in. to 1.00 in., or they may be slots having rounded ends with a size that can range from 0.060 in. wide by 0.50 in. long to 0.38 in. wide by 1.5 in. long. In FIG. 7, the entry opening patterns 95A, 95B and 95c each include a single (only one) large opening 95 extending alongside the food on a respective rack 33. It will be observed that the sizes of these openings 95 do not vary.

In one embodiment (FIG. 3), the blower 61 for circulating air through the cooking chamber 11 comprises a variable speed, reversible blower motor 101 mounted in a housing 105 mounted on a top wall 107 of the oven. The blower motor 101 has an output shaft 111 which rotates in a bearing 115 about a generally vertical axis 117. The output shaft of the motor 101 is coupled to an input shaft 119 of a blower wheel, generally designated 121, located in the upper portion 53a of the air conduit system 53 adjacent (e.g., immediately above) the exhaust opening 69 in the top wall 13 of the cooking chamber 11. The blower motor 101 is operable to rotate the blower wheel 121 about the axis of rotation 117 to circulate air through the conduit system 53 and cooking chamber 11 at velocities and flow rates suitable for cooking. Exemplary velocities include 0-600 ft/min, 10-300 ft/min, and 30-220 ft/min. Rotation of the blower wheel 121 creates suction at the suction side 121a of the blower wheel (i.e., the lower portion of the blower wheel adjacent the exhaust opening 69) to pull gas from the cooking chamber 11 through the exhaust opening 69. Gas is expelled from the blower wheel 121 at the output (exhaust) side 121b of the blower wheel (i.e., the left and right sides of the blower wheel as shown in FIG. 3) to circulate air through the conduit system 53 to the cooking chamber 11.

In one embodiment, the blower motor 101 is a 230 VAC, 3-phase, 1.2 amp, 60 Hz, ⅓ hp induction motor having a speed which is infinitely variable over a range of speeds, e.g., 50-3450 RPM. One such motor is model number P55LVDDB-1405 available from Emerson Electric Company. In another embodiment, the motor may have a speed which is variable in small increments (e.g., three, four, five, six, seven, eight, nine or ten increments, or more than ten increments, or more than twenty increments, or more than thirty increments) over a range of speeds. Other variable speed, reversible motors operable in the same or other speed ranges, voltages or power may also be suitable.

Figure 8:
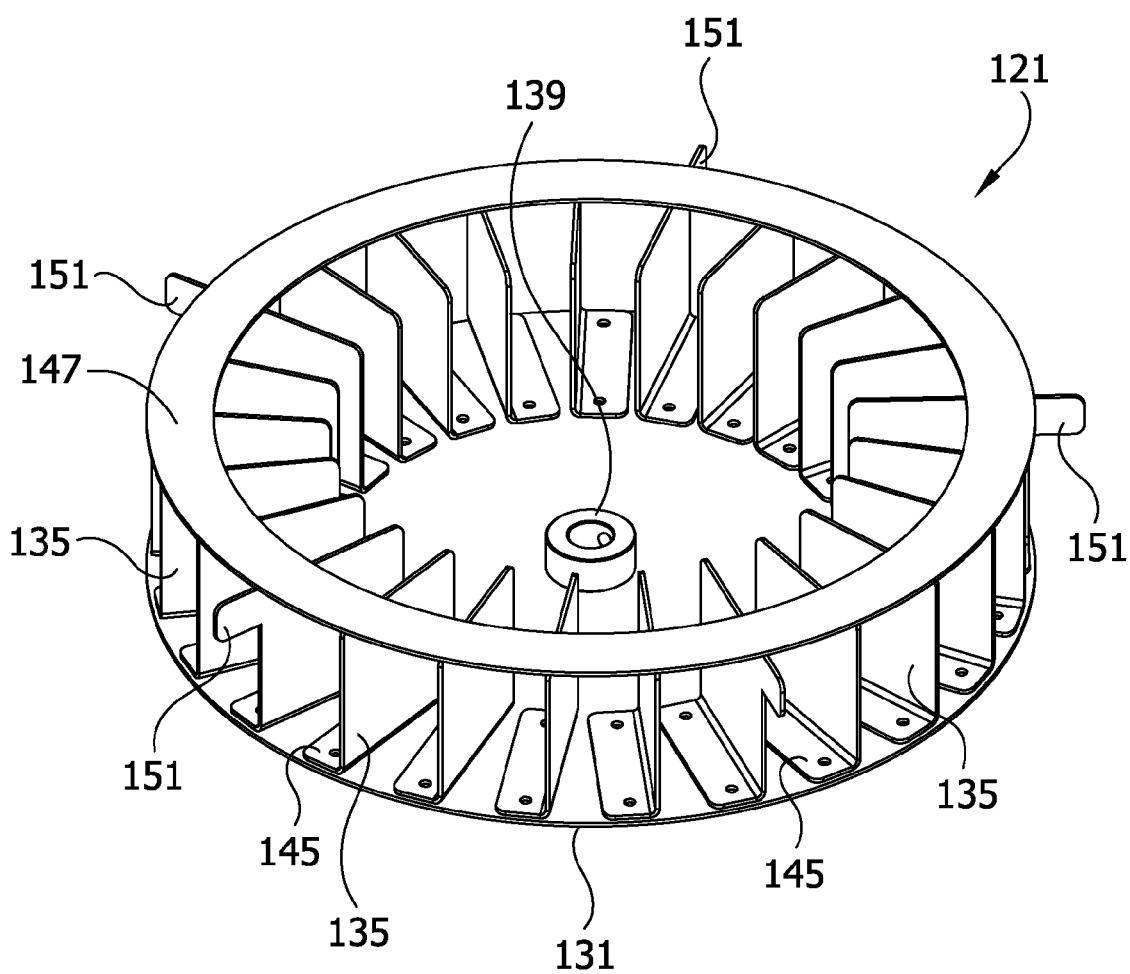
FIG. 8 is a perspective a blower wheel of the blower used in the upper section of the oven.
Figure 9:
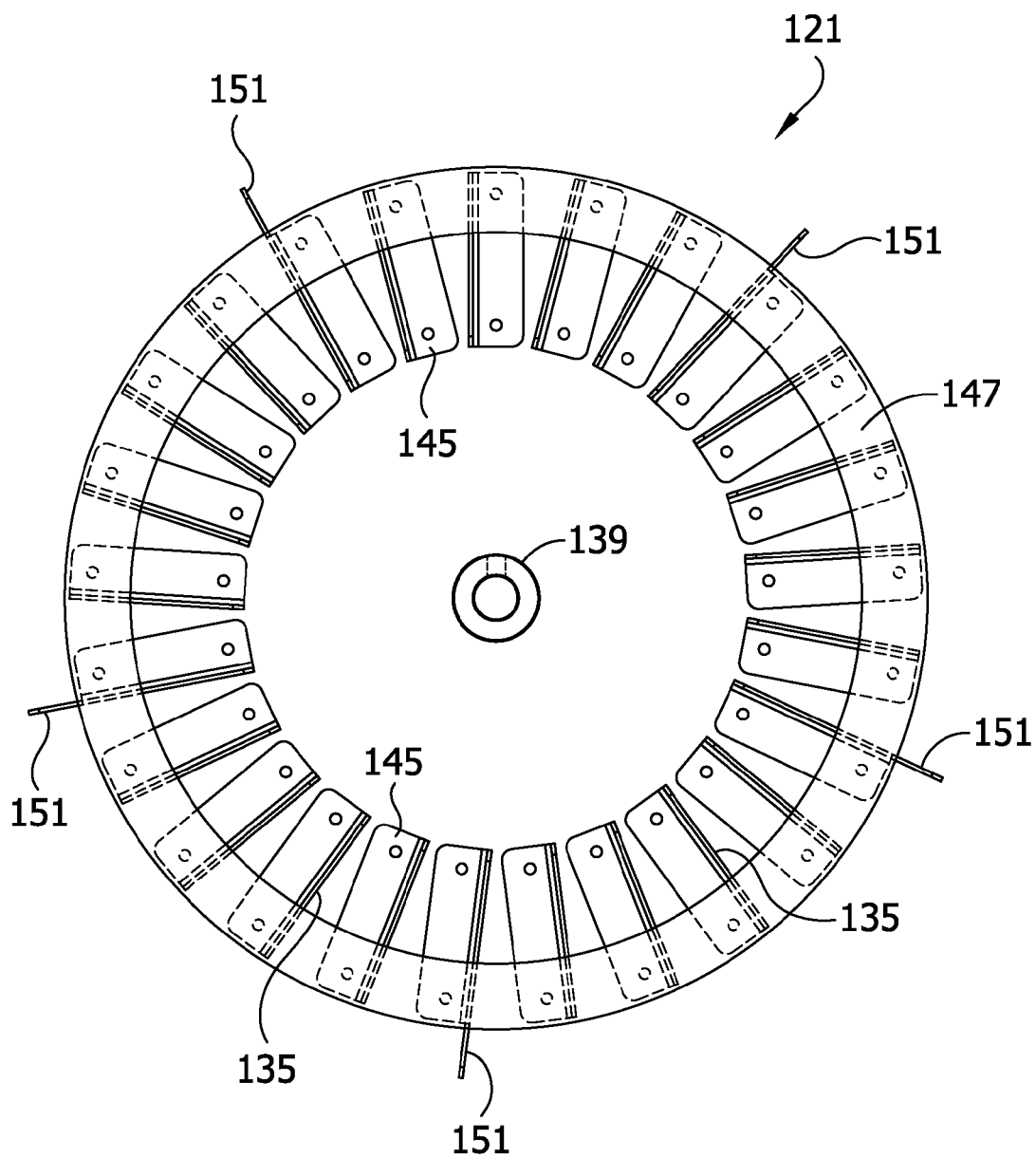
FIG. 9 is a plan view of the blower wheel.
Figure 10:
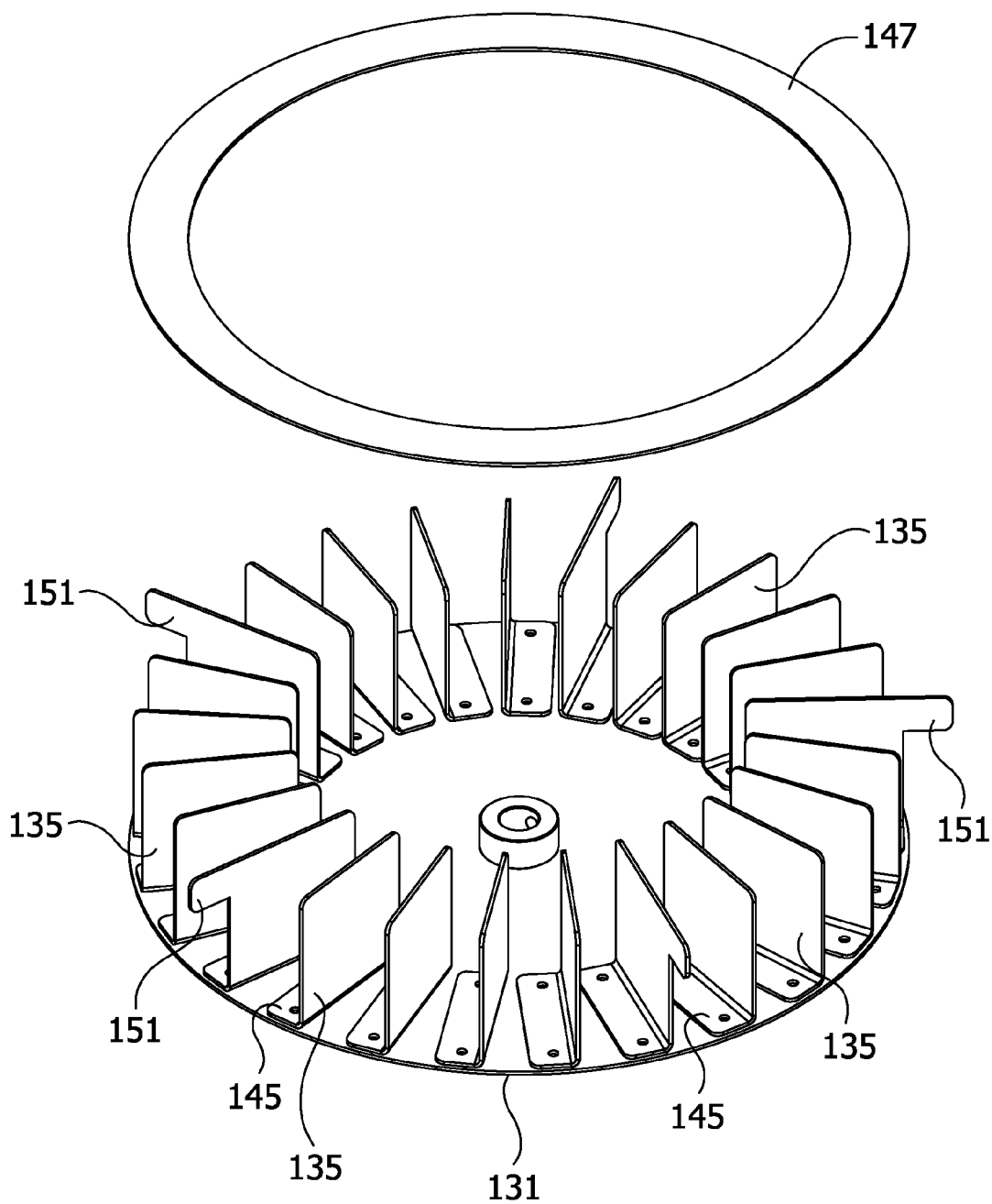
FIG. 10 is an exploded view of the blower wheel.

Referring to FIGS. 8-10, the blower wheel 121 is a flat bladed wheel comprising an upper member 131 which, in the illustrated embodiment, comprises a circular plate (also designated 131), a series of parallel flat blades 135 mounted on the circular plate, and a hub 139 on the circular plate for receiving the input shaft 119 of the blower wheel. The blades 135 are spaced at equal intervals around the circular plate 131 adjacent the periphery of the plate and are oriented in a radial direction with respect to the axis of rotation 117 of the wheel 121 so that they lie in generally vertical radial planes relative to the axis of rotation. The blades 135 are secured in position by flanges 145 affixed (e.g., spot welded or riveted) to the circular plate 131 and by a lower member 147 which, in the illustrated embodiment, comprises an alignment ring (also designated 147), affixed (e.g., spot welded) to the blades. An even or odd number of blades 135 may be used. Other blower wheel designs may be used.

Referring still to the embodiment illustrated in FIGS. 8-10, at least one of the blades 135 of the blower wheel 121, and desirably several of the blades, comprises a water-dispersion formation 151 for dispersing water into the cooking chamber 11 in a manner to be described later. In this embodiment, each such formation 151 comprises an integral extension of the blade 135 projecting in a radial direction outward from the blade generally in the same radial plane as the blade. The extensions 151 may have other shapes without departing from the scope of this invention.

Figure 11:
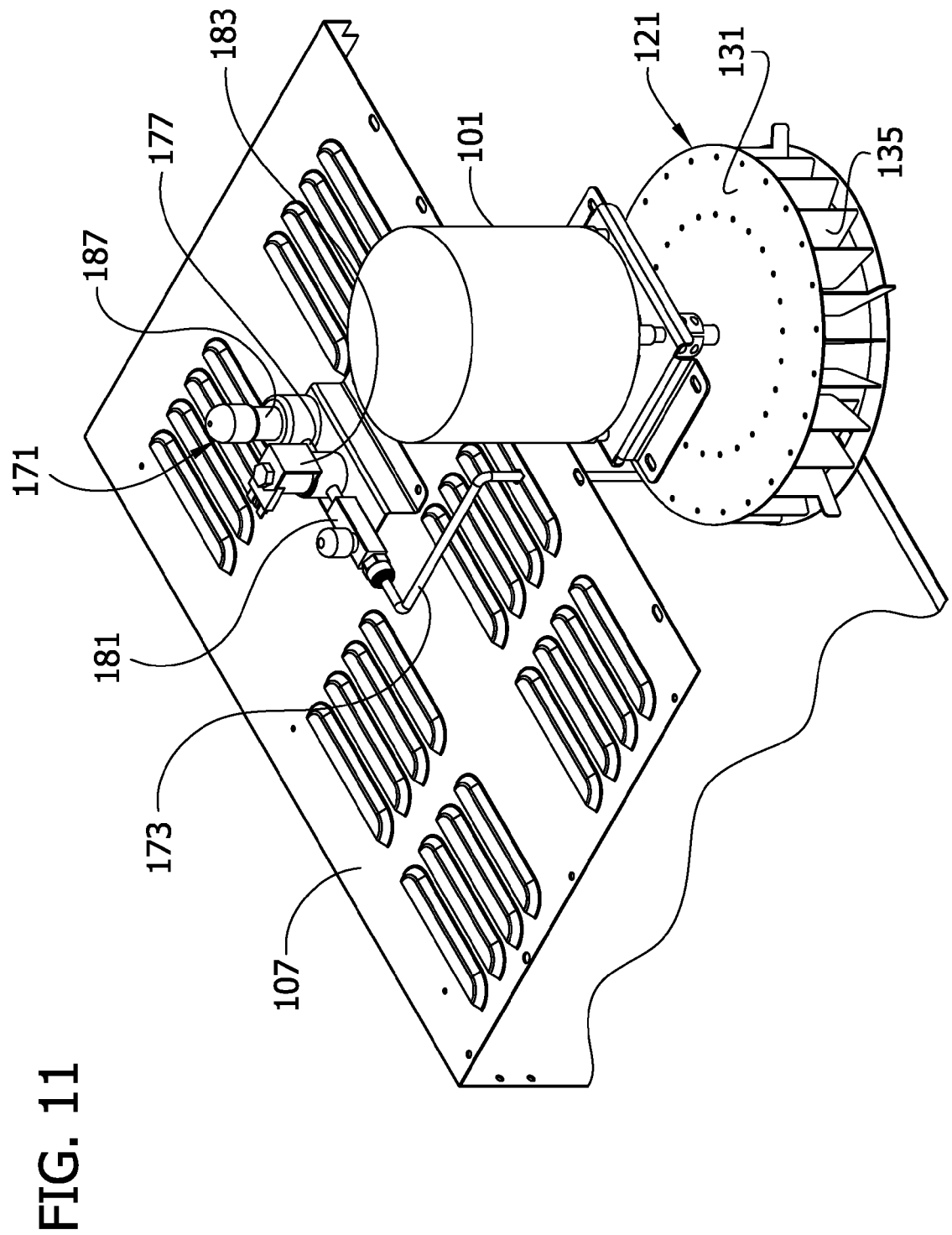
FIG. 11 is a view illustrating a water injection system of the upper section of the oven.

Referring to FIGS. 3 and 11, a water injection system, generally indicated 171, is provided for delivering water to the blower 61, and specifically the blower wheel 121, for dispersion into the air conduit system 53 and cooking chamber 11. The injection system 171 comprises at least one injector 173 mounted adjacent the blower wheel 121, and a line 177 for supplying water to the injector. A needle valve 181, solenoid valve 183 and pressure regulator 187 are provided upstream of the injector for controlling flow to the injector. In one embodiment, the water injector 173 comprises a 0.25 in. diameter stainless steel tube with a square-cut end. The components of the injection system 171 may be mounted on a top wall 107 of the oven at a location where the injector 173 extends down from the top wall to a position for delivering water for impact against the water dispersion formation(s) 151 on the rotating blades 135 of the heated blower wheel. By way of example, the lower end of the injector may be spaced about 0.5 in. above the dispersion formation(s) 151. As a result, water is dispersed as a fine spray or steam mist into the air conduit system 53 and heated by the heating elements 71 to form a vapor (steam) which is carried into the cooking chamber 11 where it settles as a layer on the bread (or other product) to promote the formation of a thin crust which is uniformly browned. The number of injectors 173 can vary.

The injector system 171 is operated to perform a desired number of water injection events (e.g., 0-4) during a cooking event. Each such event may include, for example, a number of time-based cycles each comprising a repeat of one second on and two seconds off. Other injector configurations and injection cycles and frequencies are possible.

Figure 12:
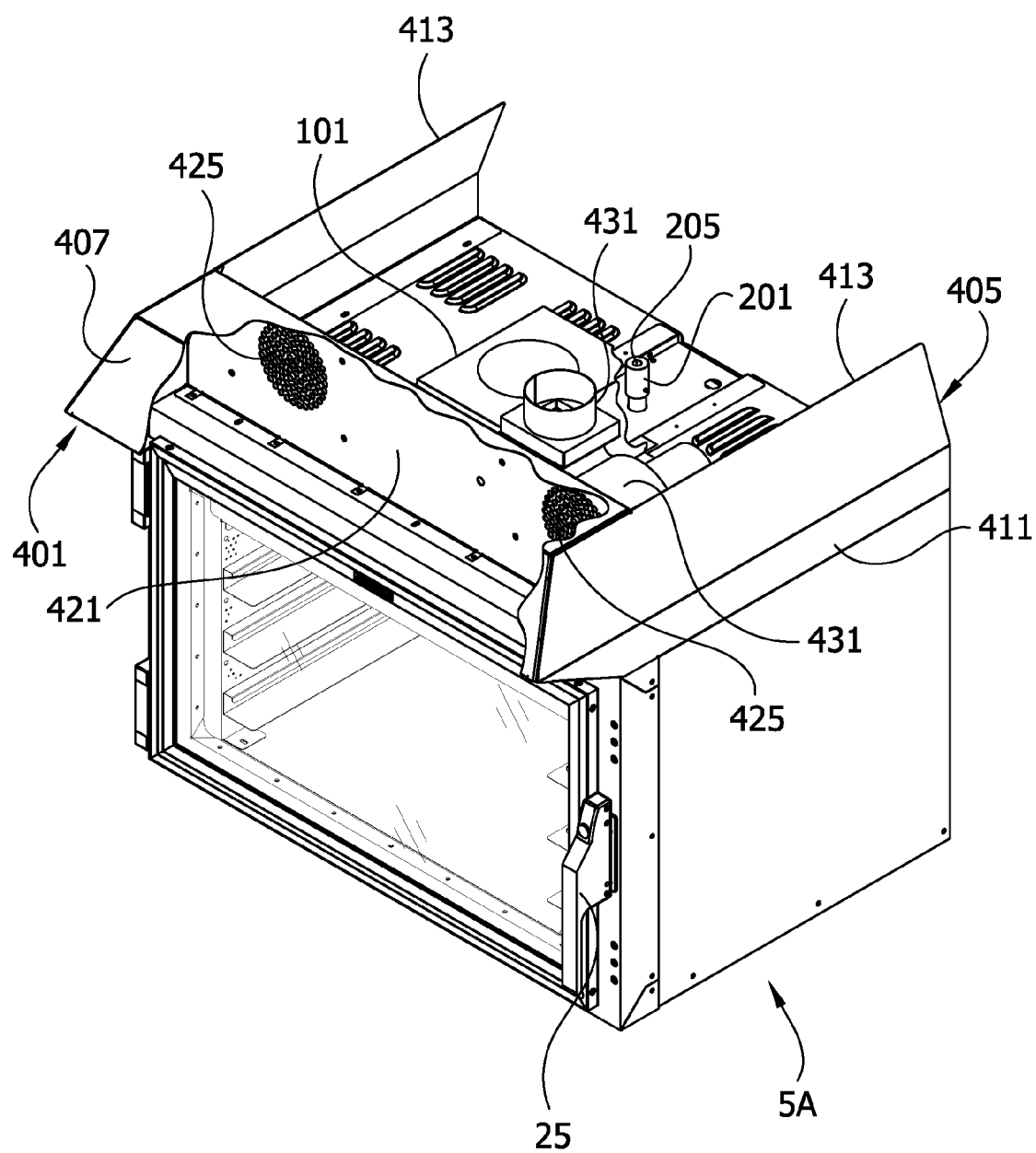
FIG. 12 is a perspective view of the upper section of the oven with parts of a hood removed to show details of a vapor collection system.
Figure 13:
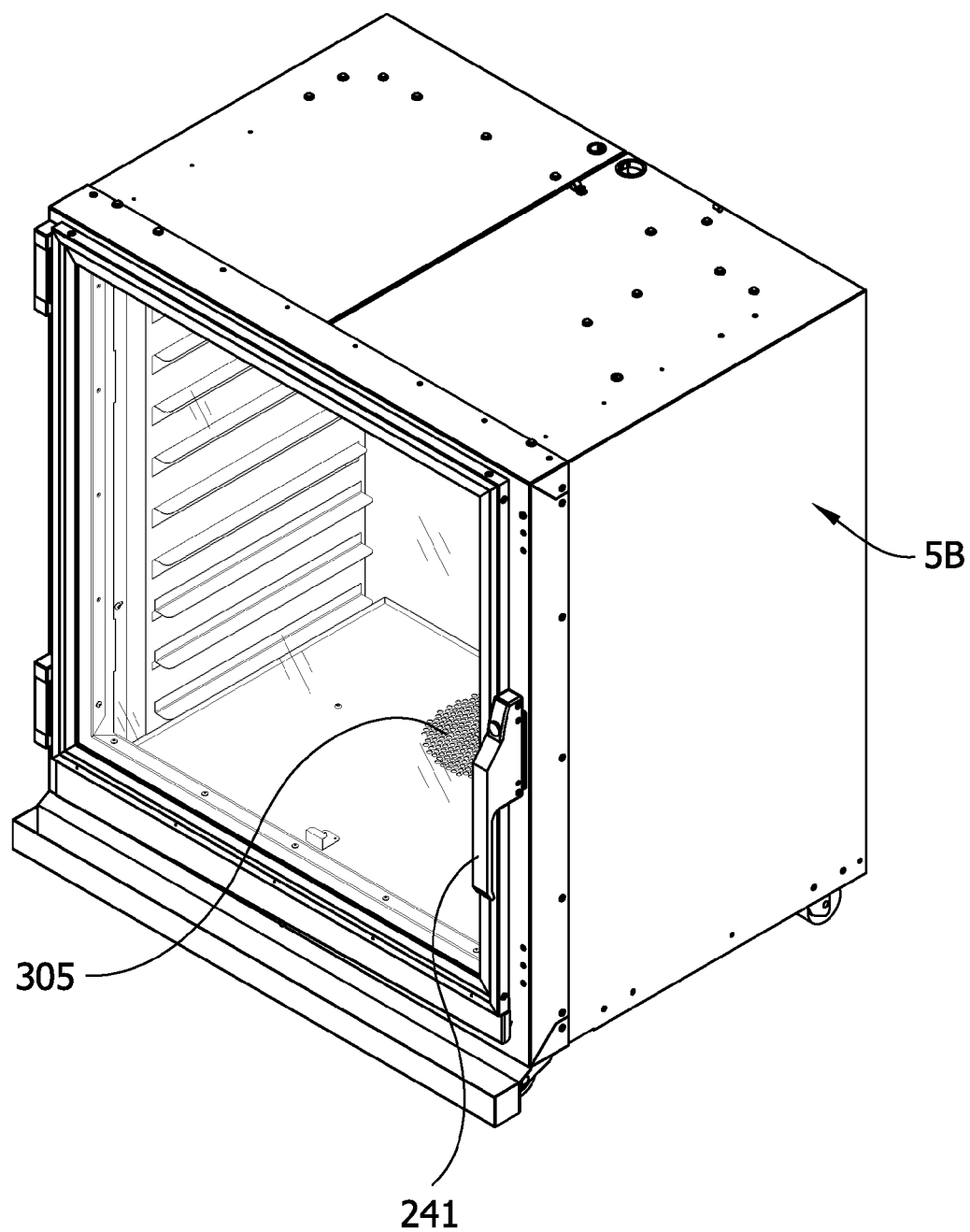
FIG. 13 is a perspective of a lower section of the oven.
Figure 14:
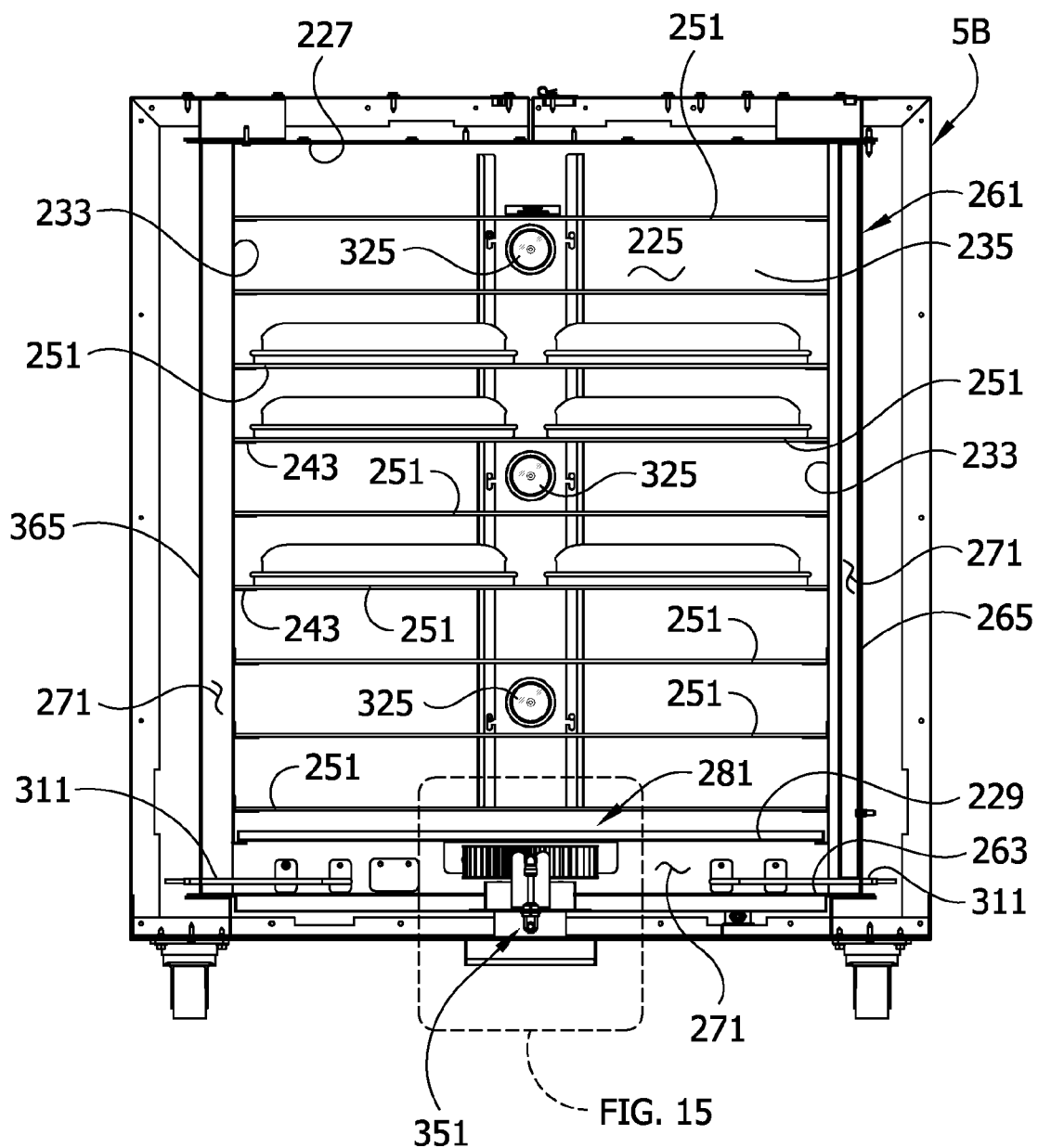
FIG. 14 is a front elevation of the lower section of the oven of FIG. 12, shown partially in section.
Figure 15:
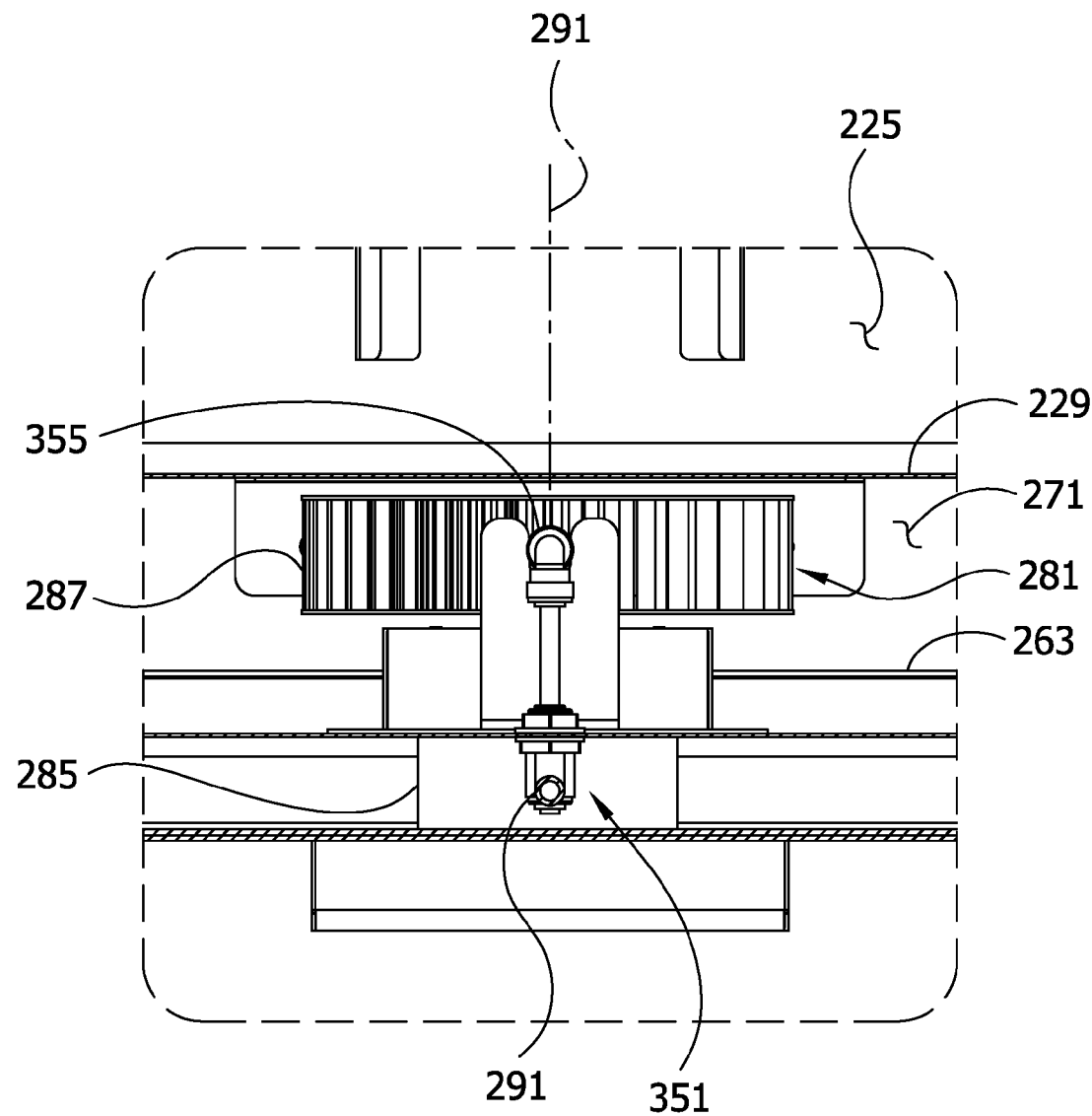
FIG. 15 is an enlarged portion of FIG. 14 showing details of a blower and water injection system in the lower section of the oven.
Figure 16A:
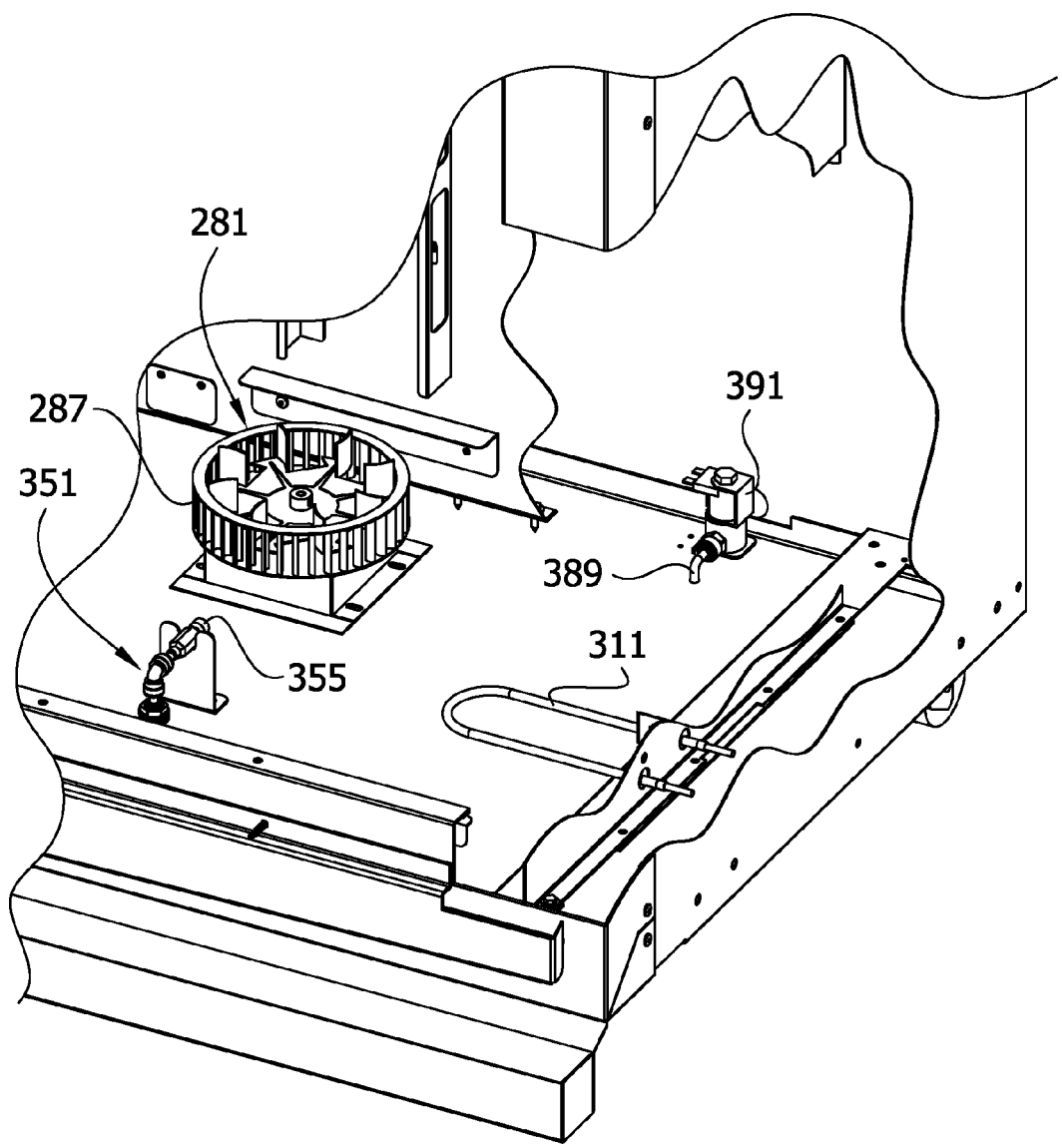
FIG. 16A is an enlarged portion of FIG. 16 showing details of the water injection system in the lower section of the oven.
Figure 17:
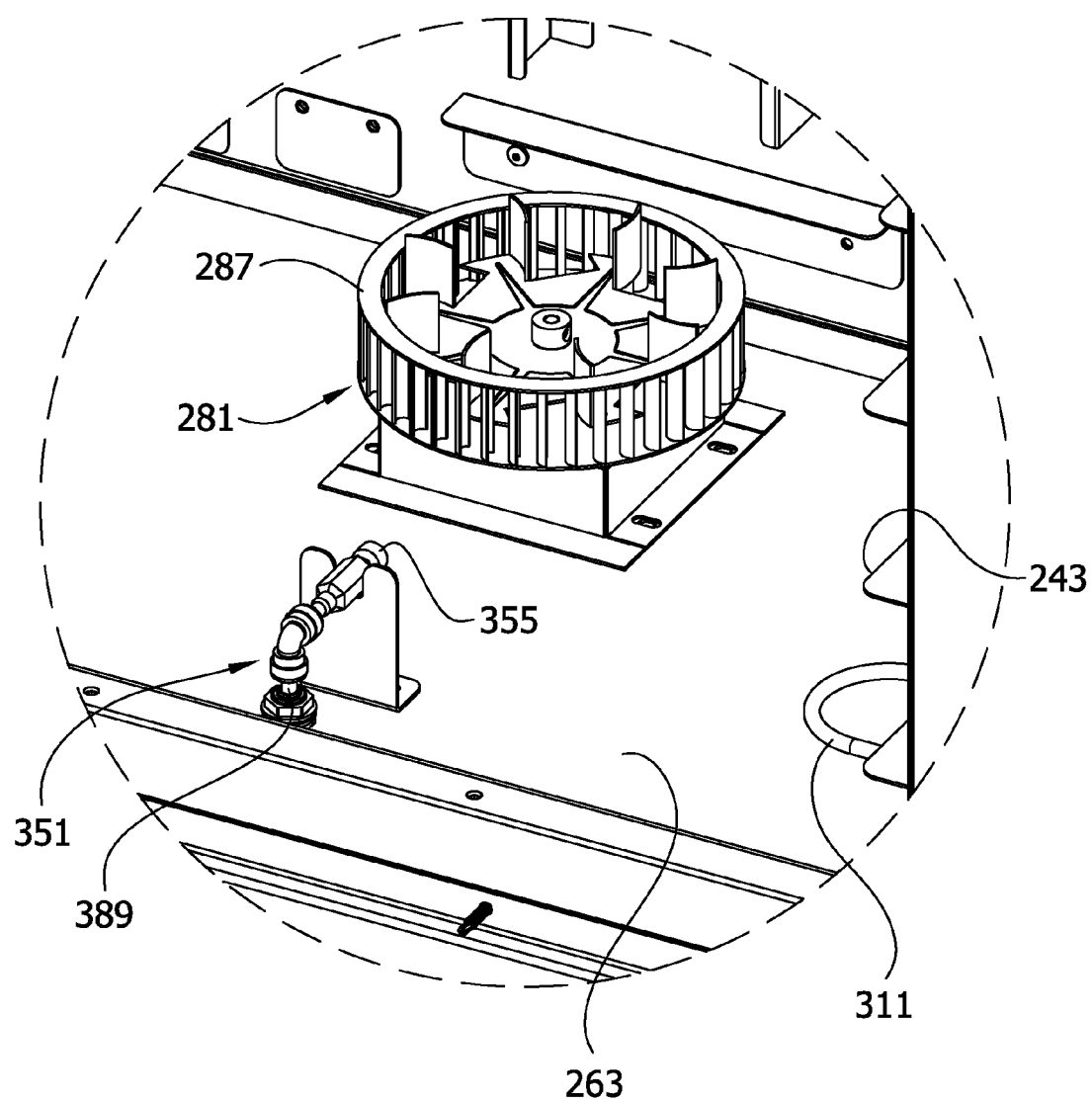
FIG. 17 is an enlarged portion of FIG. 16 showing details of the blower and water injection system.

The cooking chamber 11 and air conduit system 53 is generally a closed system in which substantially the same air re-circulates over and over during a cooking event. As cooler air is heated, as during initial start-up of the oven, the volume of the air in the conduit system and cooking chamber will increase. To prevent excessive build-up of air pressure inside the cooking chamber, a relief valve 201 is provided to release air from the conduit system 53 to the atmosphere. An exemplary relief valve 201 is shown in FIG. 12. It comprises a short tubular fitting having an inlet end communicating with the air conduit system 53 and an outlet end which is closed except for a small opening 205 sized to provide suitable pressure relief. By way of example, the opening may be a 0.375-in. diameter opening.

Referring to FIGS. 13-19, the lower (e.g., proofing) section 5B of the oven 1 comprises a second cooking (e.g., proofing) chamber 225 defined by a top wall 227, a removable bottom wall 229, opposite side walls 233, and a back wall 235. The chamber 225 is accessible by opening a door 241 which closes the front of the chamber. One or more rack supports 243 are secured to the walls of the chamber for supporting food racks 251 in the chamber. In this particular embodiment, up to nine racks can be used in the cooking chamber 225, and each rack is sized to hold a number of pans of bread dough. It will be understood that the number and capacity of the racks 251 can vary without departing from the scope of this invention. The cooking chamber 225 is surrounded by a housing 261 having a bottom wall 263 and opposite side walls 265 spaced from respective walls of the cooking chamber 225 to provide a conduit system or flow path 271 for circulating heated air (or other gas) through the cooking chamber. Other flow path configurations may be used.

A blower, generally designated 281 in FIGS. 14-17, is mounted below the bottom wall 229 of the cooking chamber 225 for circulating air (or other gas) through the air conduit system 271 and cooking chamber 225. In one embodiment, the blower 281 comprises a single speed, single direction blower motor 285 driving a blower wheel 287 positioned in the air conduit system 271 below the bottom wall 229 of the cooking chamber. The blower wheel 287 rotates about a generally vertical axis 291. In the illustrated embodiment, air enters the cooking chamber 225 through a plurality of entry openings 301 in the side walls 233 of the chamber and exits through an exhaust 305 (FIG. 13) in the bottom wall 229 of the chamber. A heater 311 comprising, for example, one or more electric resistance heating elements heats the circulating air. The heating elements 311 are located in the air conduit system 271 below the bottom wall 229 of the cooking chamber 225. Other locations are possible. A temperature sensor 321 (FIG. 24) is provided in the cooking chamber 225 for sensing the temperature in the chamber and providing feedback to the control system of the oven. The cooking chamber 225 is illuminated by lights 325 mounted in the chamber, e.g., on the back wall 235 of the chamber.

Figure 18:
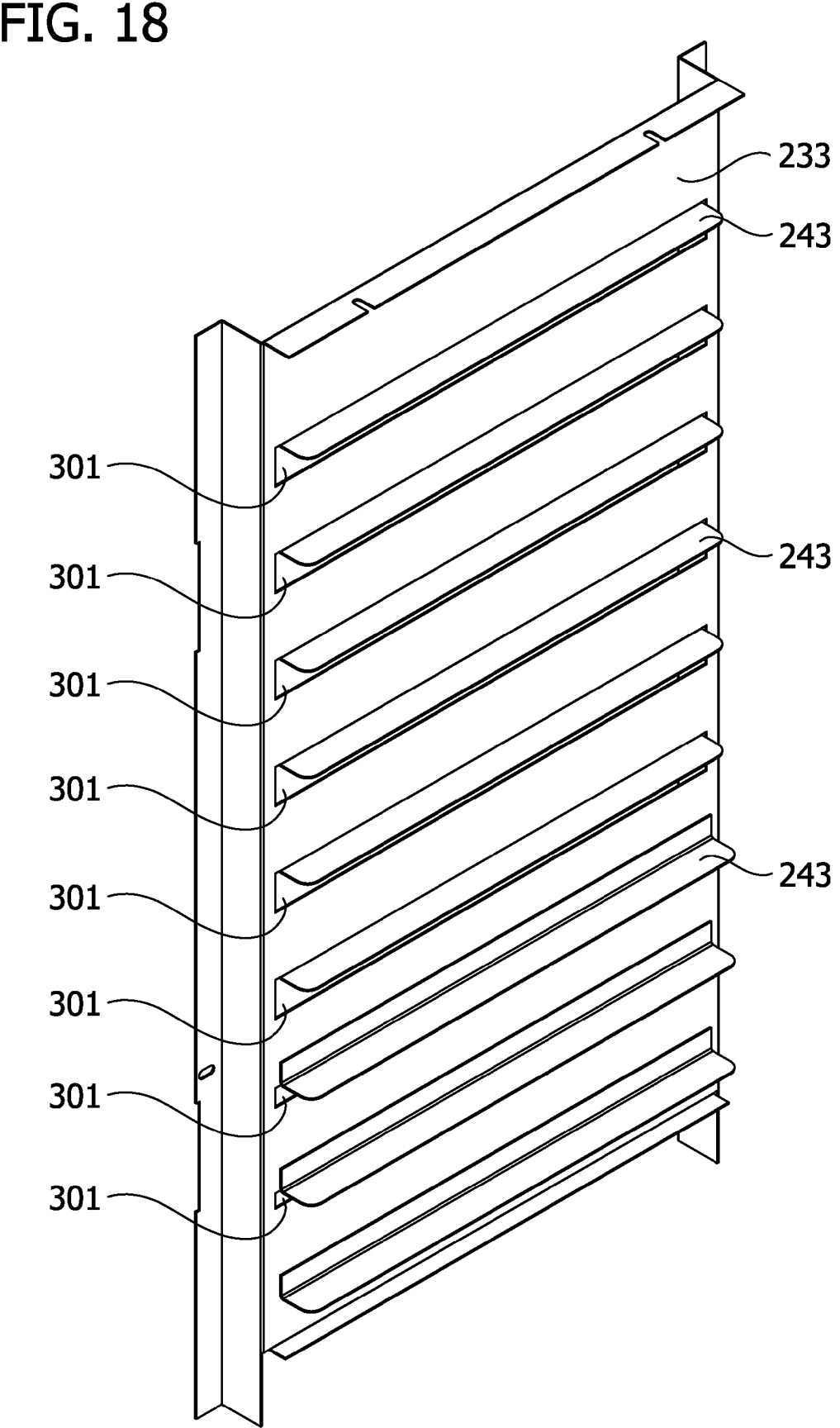
FIG. 18 a perspective of a side wall of the cooking chamber of the lower section of the oven.
Figure 19:
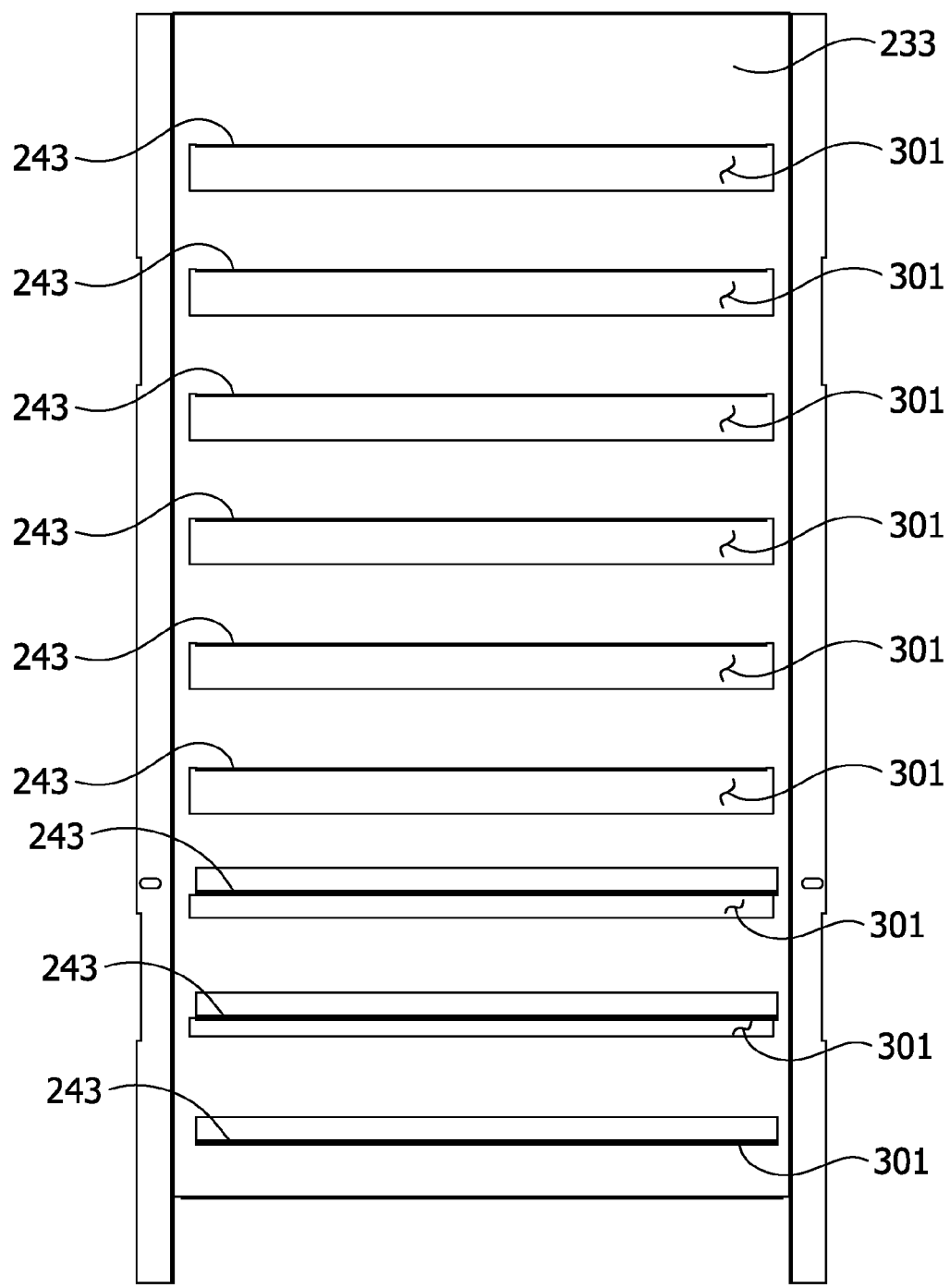
FIG. 19 is an elevation of the side wall of FIG. 18.
Figure 20:
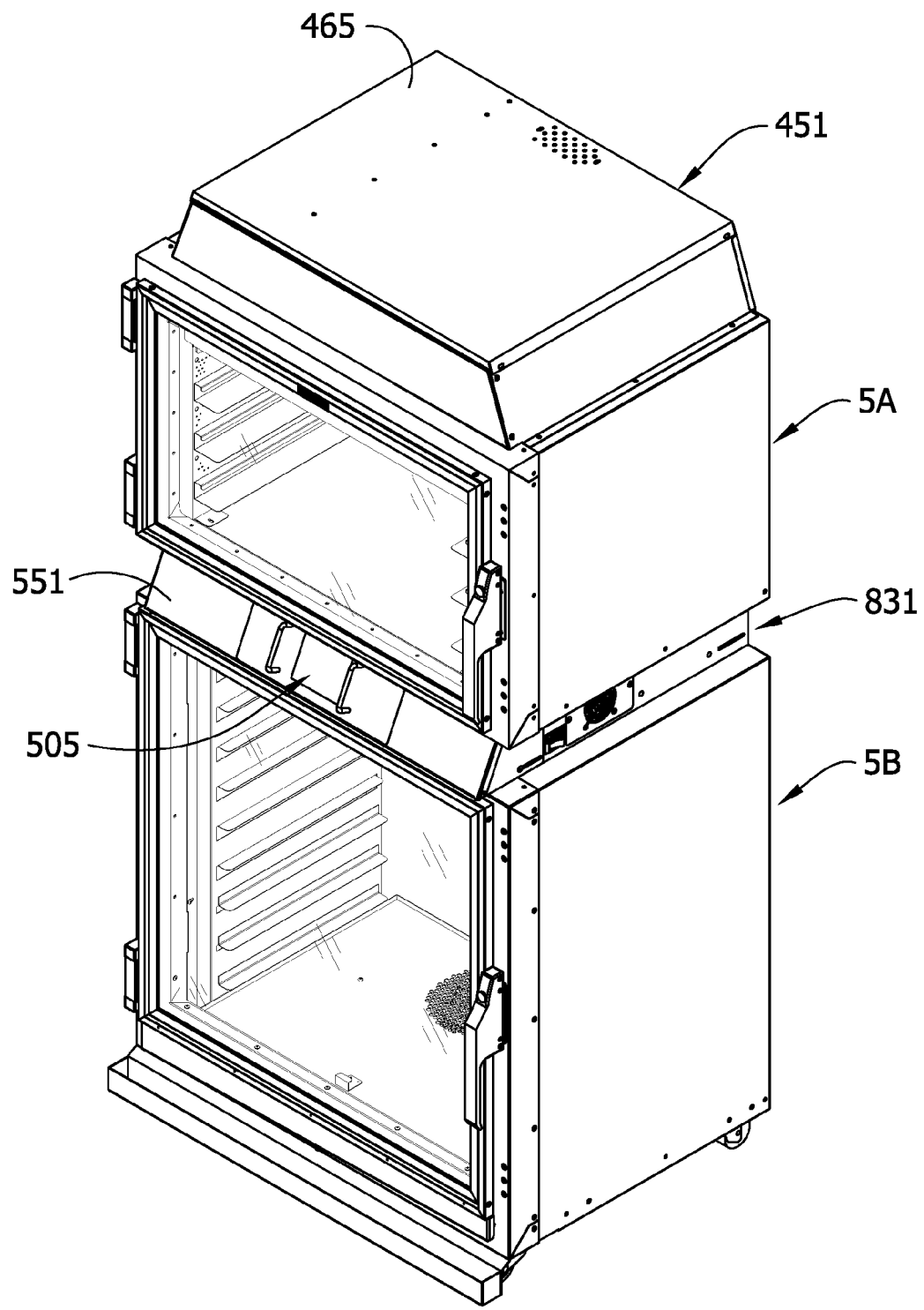
FIG. 20 is a perspective similar to FIG. 1 but showing a second embodiment of a vapor collection system on the oven.

FIGS. 18 and 19 show an exemplary pattern of entry openings 301 in the side walls 233 of the cooking chamber 225. (Only one side wall 233 is shown, the opposite side wall being essentially identical. However, the opposite wall 233 may have different entry openings 301 to balance air flow to food products within the cooking chamber 225.) The entry openings 301 are arranged and configured for directing heated air to the food on the various racks 251. In general, the number and/or size of the openings 301 (i.e., the overall air flow area of the opening or openings) associated with each rack level increases from the bottom of the cooking chamber 225 toward the top of the chamber to insure that substantially the same volume of air is provided to each level of food in the cooking chamber 225, in a similar (but inverted) manner as described previously in regard to the entry openings 65 in the upper cooking chamber 11.

In the particular configuration of FIGS. 18 and 19, the entry openings 301 are elongate rectangular openings, one such opening extending horizontally at each rack level. As will be observed, the height of the openings 301 gradually increases from the bottom toward the top of the side wall 233, with the uppermost openings 301 having approximately the same height. Other entry opening configurations are possible. In any event, heated air is delivered through these openings 301 and into the cooking chamber 225 at velocities and flow rates which are suitable for the cooking process being carried out, e.g., a bread proofing process.

A second water injection system, generally indicated 351, is provided for delivering water to the output (exhaust) side 121b of the blower wheel 287 for dispersion into the air conduit system 271 where it is atomized, heated, vaporized and delivered with the heated air to the cooking chamber 225 to promote the cooking (e.g., proofing) process. (See FIGS. 15-17). The water injection system 351 comprises at least one injector 355 mounted below the bottom wall 229 of the cooking chamber generally adjacent the blower wheel 287, although other locations are suitable. Water is supplied to the injector 355 via a supply line 389. A valve 391 in the supply line 389 is operable for controlling flow to the injector 355 (see FIG. 16A). In one embodiment, the water injection system 351 is operated according to a program which can be varied depending on the particular cooking process being performed in the oven. By way of example, the injector system 351 may be operated to perform a number of water injection events (e.g., 0-4) during a cooking event, with each such injection event including a number of time-based cycles each comprising a repeat of one second on and two seconds off. In another embodiment, the water injection system 351 is operated according to a humidity control system 393 (FIG. 24) comprising a closed loop feedback control having a humidity sensor 395 mounted within the conduit system 271 and controller 397. Humidity detected by the humidity sensor 395 is reported to the controller 397. If the humidity is above a specified high limit, the controller 397 signals the water injection system 351 to deliver less or no water to the conduit system 271 to decrease the humidity. If the humidity is below a specified low limit, the controller 397 signals the water injection system 351 to deliver more water to the conduit system 271 to increase the humidity. Other injector configurations and injection cycles and frequencies are possible.

A vapor collection system, generally indicated at 401, is provided above the upper section 5A of the oven (see FIGS. 1 and 12). The system 401 comprises a hood generally indicated at 405, having a front portion 407 which overhangs the doors 25, 241 of the upper and lower sections 5A, 5B of the oven, and a rear portion 411 comprising sides walls 413 extending above opposite sides of the upper section 5A of the oven. The front and rear portions 407, 411 are separated by a partition 421 having two exhaust openings 425 therein. An exhaust fan 431 is mounted on top of the upper section of the 5A of the oven behind one of the two exhaust openings 425. (The position of the exhaust fan 431 may vary depending on the particular installation. In general, it is desirable to mount the fan adjacent the side of the door 25 opposite the hinge to maximize the amount of vapor collected.) Vapor released from the cooking chambers 11, 225 when the doors are opened is captured by the front portion 407 of the hood and exhausted through one or both of the openings 425 and directed to a vent 431. In the illustrated embodiment, only one exhaust fan 431 is used, and vapor is exhausted through the opening 425 behind which the fan is mounted. The vent is adapted for connection to a flue 435 (FIG. 1) communicating with atmosphere either inside or outside the building in which the oven 1 is installed.

FIGS. 20-23 illustrate an alternative vapor collection system, generally designated 451, which eliminates the need for a vent and/or flue as in the previous embodiment. In this system 451, vapor (steam) from the cooking chamber 11 is vented up through a tubular member or other vapor conduit 455 communicating with the chamber 11 to the inlet 457 of a steam condensing device 461 mounted on the top wall 107 of the oven inside an enclosure 465 (e.g., hood). Steam in the cooking chamber 11 is vented up through the conduit 455 as a result of the difference between the pressure inside the cooking chamber 11 and ambient pressure. No assistance (e.g., a fan or compressed air source) is required to move steam through the vapor collection system 451. In one embodiment, the steam condensing device 461 is a condensing coil (also designated 461) comprising a plurality of helical turns 467 which wind down away from the inlet 457 for gravity feed of condensate to an outlet 475 of the condensing device. In the illustrated embodiment, the coil 461 surrounds or wraps around the housing 105 which houses the blower motor 101. The slope at which the helical turns 467 wind down may be any slope sufficient to cause gravity feed of condensate to the outlet 475, such as a slope between 1 and 20 degrees. In one embodiment, the slope is a 5 degree slope sufficient to cause gravity feed of condensate while also accommodating a 3 to 4 degree out-of-level floor condition. The flow of steam and condensate through the coil 461 is generally indicated by arrows in FIG. 21. The outlet 475 communicates with a suitable drain or other collection device 479 for disposal of the condensed liquid.

Figure 23:
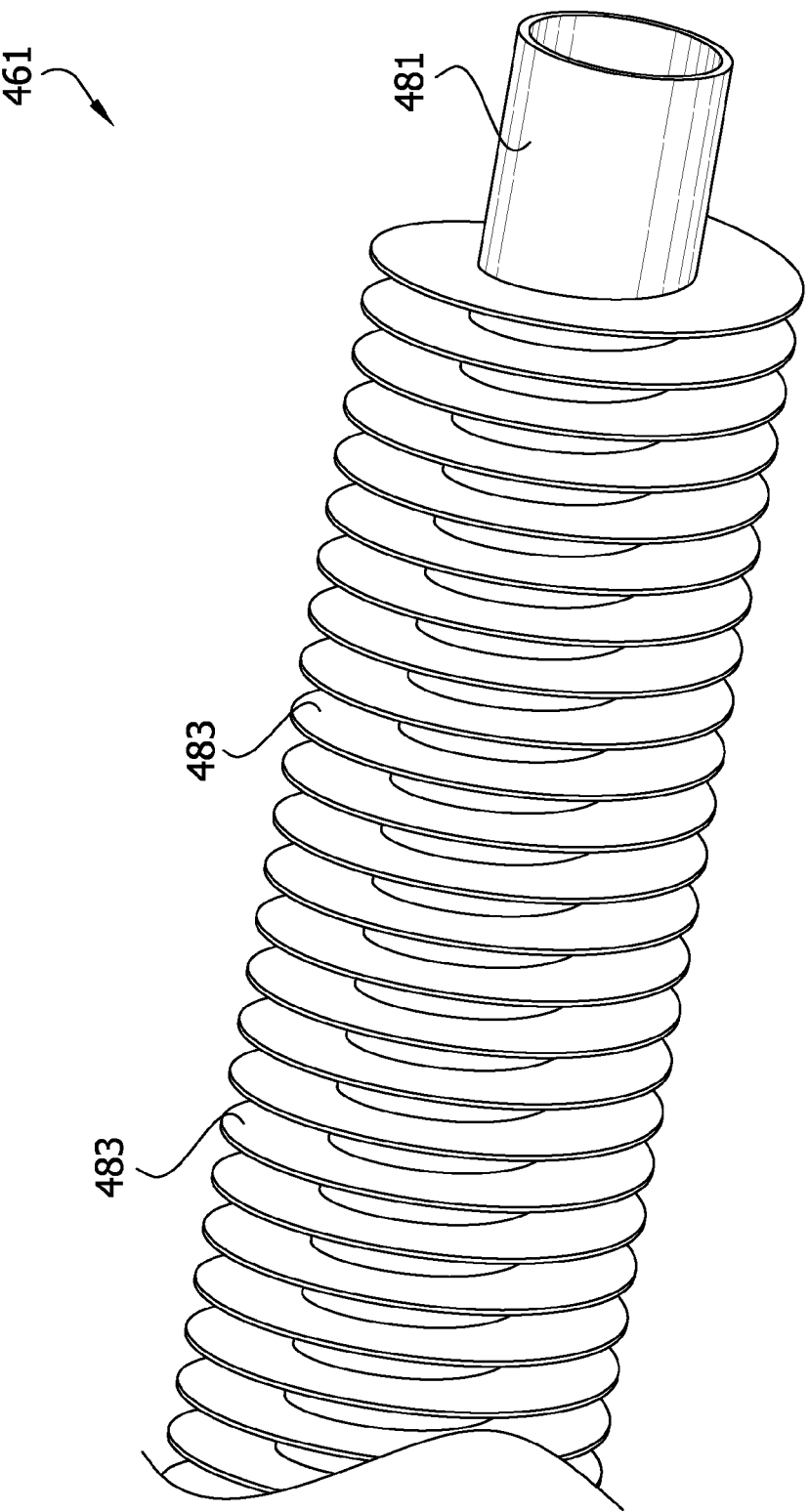
FIG. 23 is a perspective of a portion of finned tubing.

In one embodiment, the condensing coil 461 desirably comprises finned tubing. Such tubing may comprise a tube 481 having fins 483 coiled around and extending radially from the tube, as shown in FIG. 23. One condensing coil 461 suitable for this purpose is a coil formed from 1.0 in. OD finned stainless steel tubing sold under the trademark Finbraze® by ENF International Inc. of Mobile Ala. Suitable finned tubing can be constructed by different methods. For example, fins 483 can be brazed to the tubing 481. Alternatively, the fins 483 can be extruded to the tubing 481 by a cold rotary extrusion process in which continuous helical fins are radially extruded from aluminum tubing. By way of example but not limitation, the condensing coil 461 may comprise stainless steel smooth-bore tubing 481 with copper fins 483. Desirably, such tubing 481 is constructed by extruding copper helical fins 483 directly onto the stainless steel tubing. Alternatively, the fins can be extruded as a "sleeve" and heat-expanded to bond to the stainless steel tubing. Several factors must be balanced to accomplish efficient steam condensation, including the inside diameter of the tubing 481 of the condensing coil 461, the length of the tubing, the surface area (including fins 483) of the tubing, and the slope of the tubing.

Figure 21:
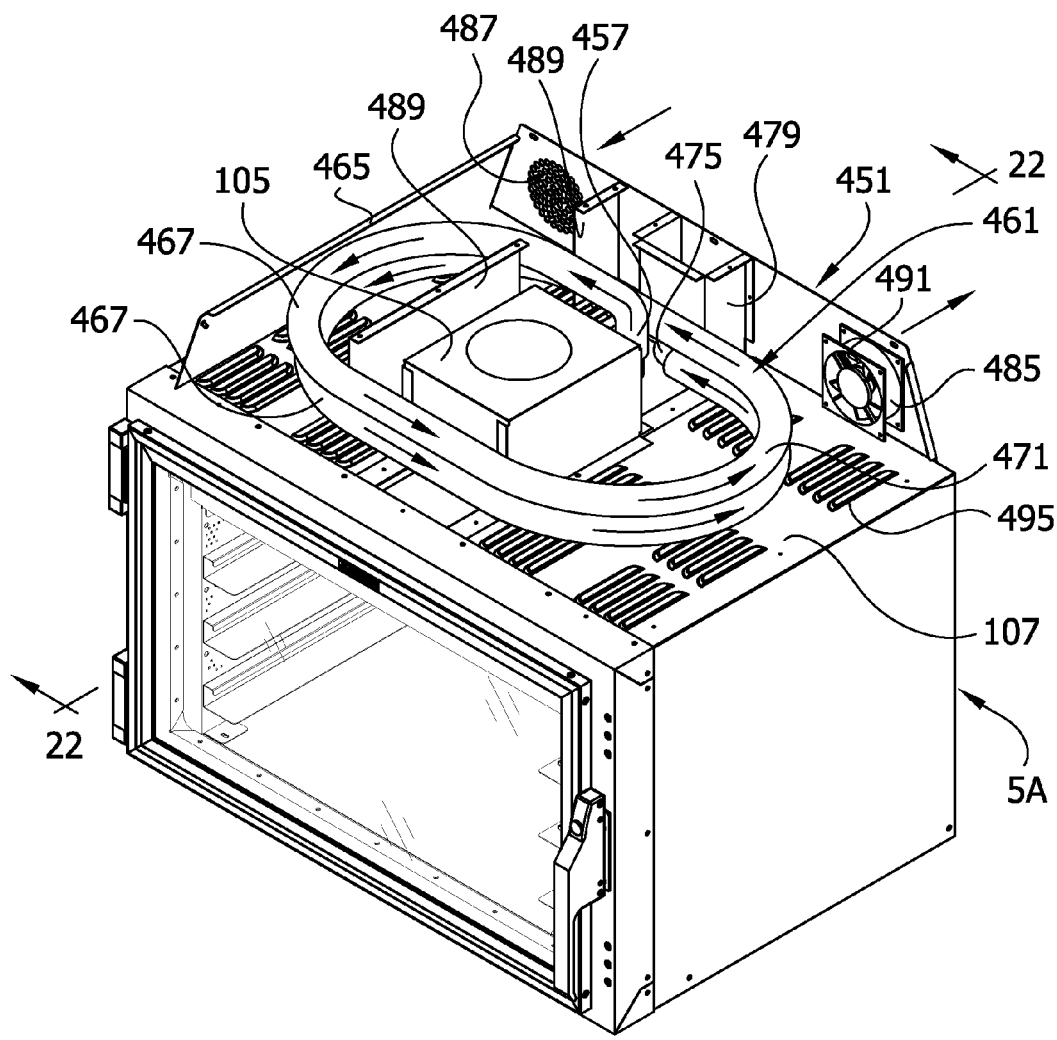
FIG. 21 is a perspective of an upper section of the oven of FIG. 20 with parts of the vapor collection system removed to show details and with arrows generally indicating flow of steam and condensate through the vapor collection system.
Figure 21A:
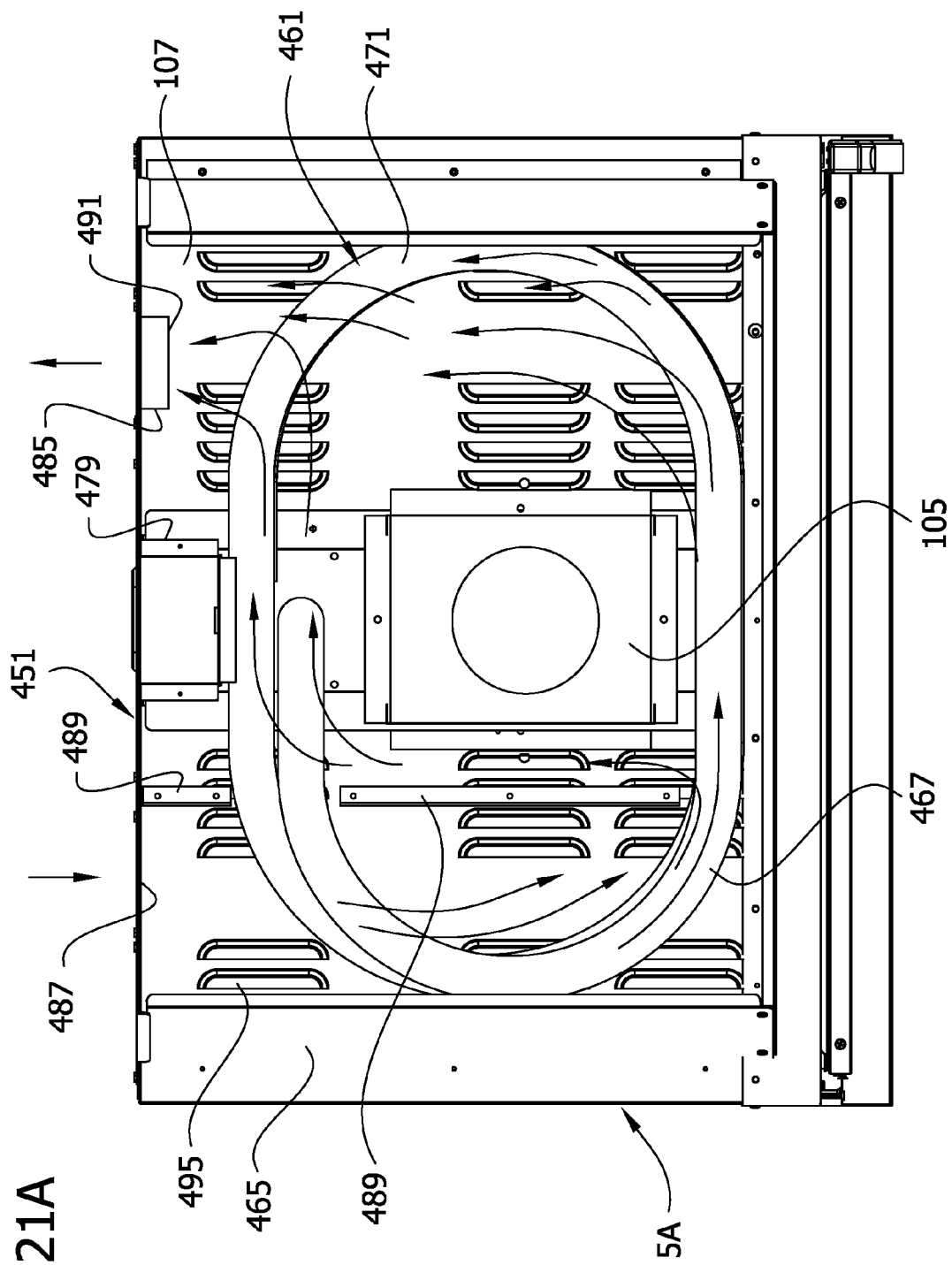
FIG. 21A is a plan view of the upper section of the oven of FIG. 20 with parts of the vapor collection system removed to show details and with arrows generally indicating cooling air flow over the vapor collection system.
Figure 22:
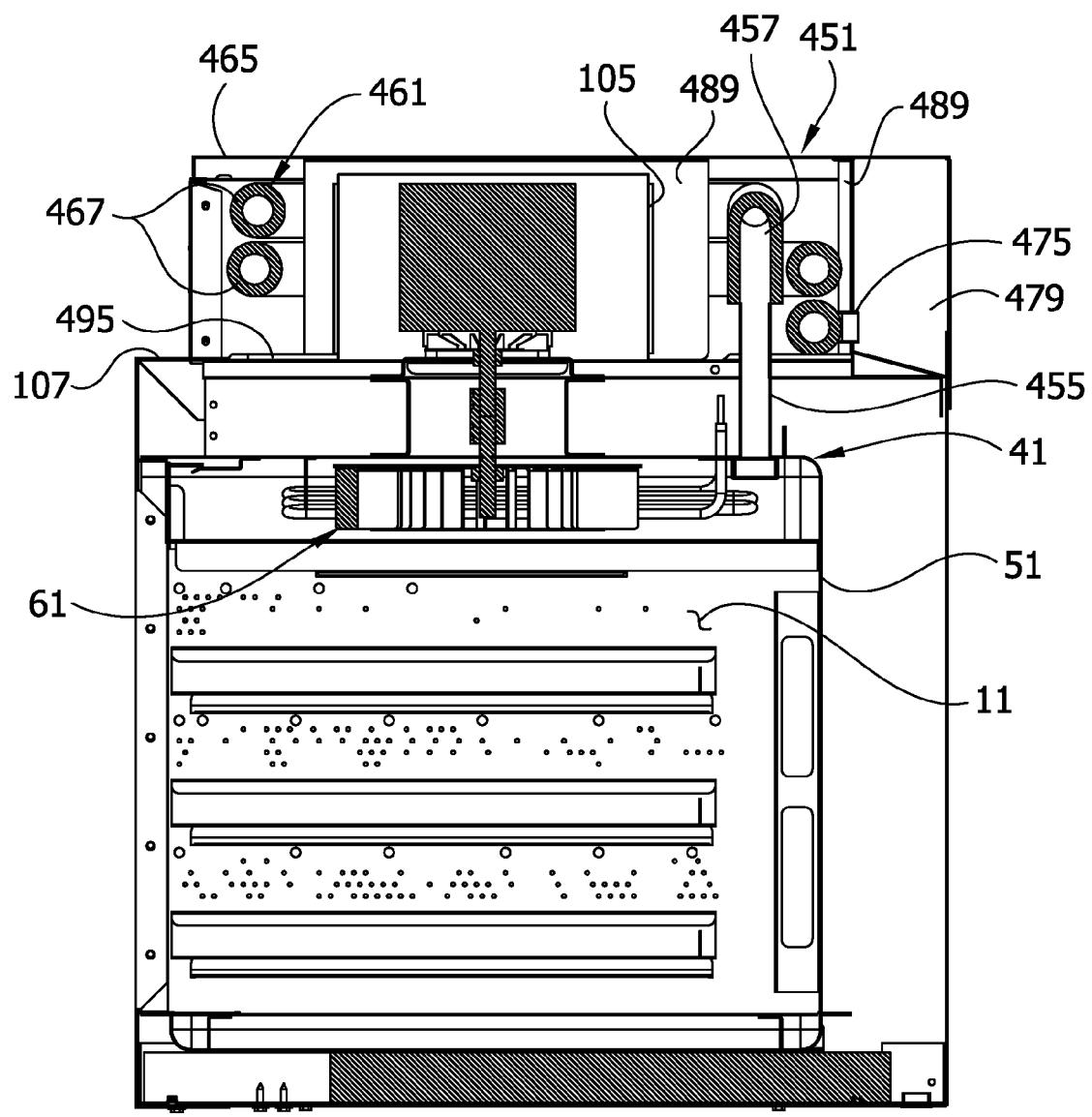
FIG. 22 is a vertical section on line 22-22 of FIG. 21.

Referring to FIGS. 21 and 21A, one or more fans 485 are mounted on the enclosure 465 for moving relatively cool air into the enclosure through one or more inlets 487 in the rear wall of the enclosure, along a path in which the cooling air flows over the cooling coil 461 and out of the enclosure via an exhaust 491. One or more baffles 489 are disposed within the enclosure 465 to direct the air flow (generally indicated by arrows in FIG. 21A) to contact substantially the entire surface area of the cooling coil 461 (e.g., at least 80 percent of the coil) and to prevent "short circuiting" of the air flow from the inlet 487 to the exhaust 491. As a result, steam in the coil 461 is cooled and condensed into a liquid which drains through the outlet 475 of the coil to the collection device 479 for disposal. Louvers 495 are provided in the top wall 107 of the oven for venting hot air which collects between the housing 41 and the top wall 107 of the oven into the enclosure 465 where it is also exhausted through exhaust 491. Alternatively, a natural convection cooled coil may be used in which the coil is large enough such that sufficient condensation occurs within the coil as a result of natural convection cooling, without the fan 485.

Figure 24:
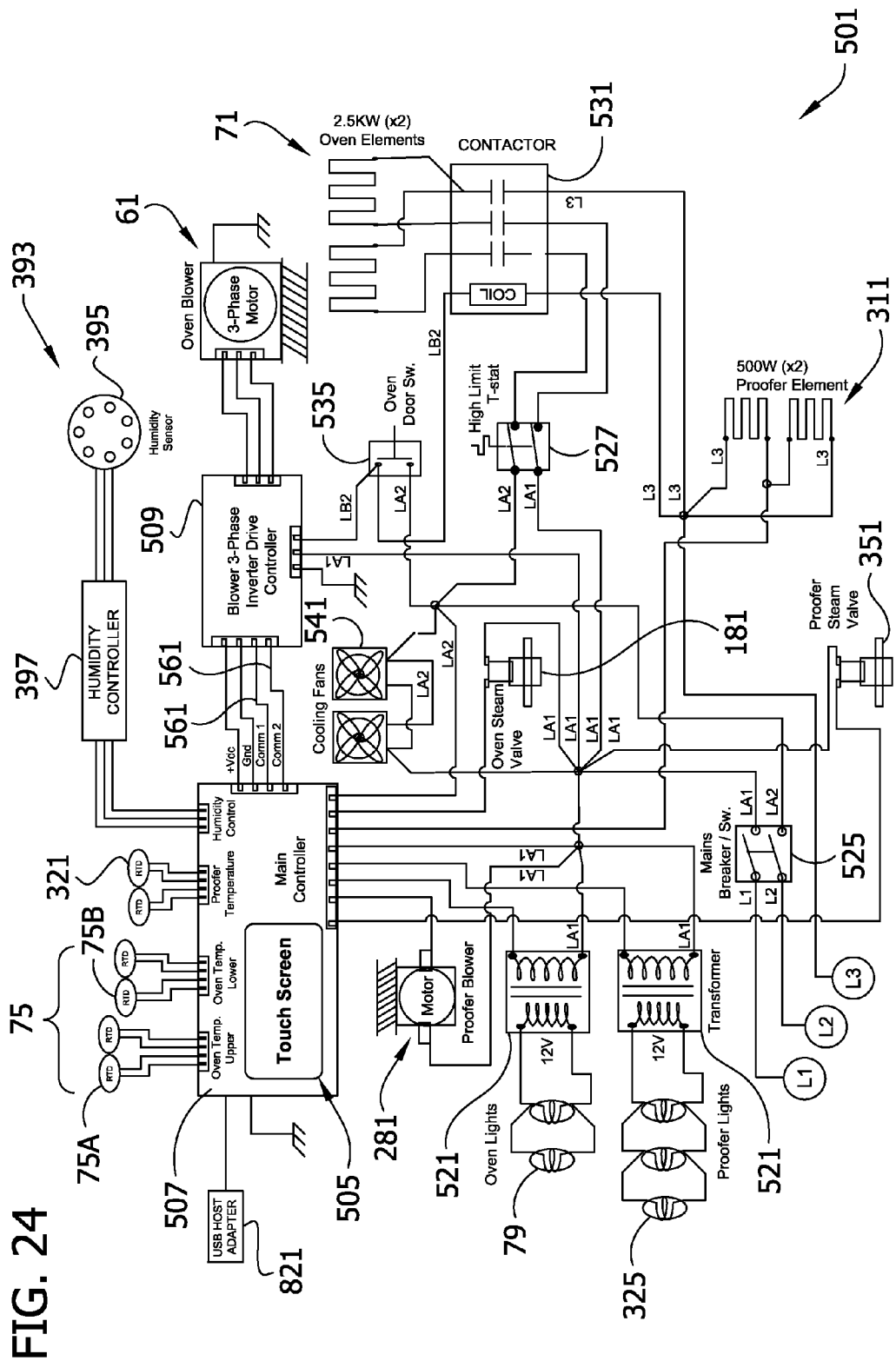
FIG. 24 is a wiring diagram.

Referring to the wiring diagram of FIG. 24, the operation of the oven 1 is controlled by a control system 501 comprising, in one embodiment, an operator input 505, a main controller 507 and a blower speed/direction controller 509. In addition to the components described above, the diagram also includes the following components: transformers 521 for reducing the voltage/current to the oven lights 79, 325, main breaker switches 525, a high-limit thermostat 527 for setting an upper temperature limit in the cooking chamber 11, a contactor device 531 associated with the heater 71 for the cooking chamber 11, and an oven door switch 535 which prevents the operation of the blower unless the door 25 of the cooking chamber 11 is closed. The electrical components of the control system 501 are cooled by cooling fans 541. Alternatively, only one cooling fan 541 may be used.

The operator input 505 comprises suitable input devices (e.g., a touch screen, switches, buttons, or other devices) mounted on a control panel 551 at a convenient location on the oven, such as at the front of the oven between the upper and lower sections 5A, 5B of the oven (see FIG. 1). The operator input 505 allows an operator to input for either of the cooking chambers 11, 225 various cooking parameters, instructions and/or other information necessary or desirable for performing a cooking operation, including the type of food to be cooked, information relating to the speed and direction of blower operation, number of reversals, desired temperatures, desired humidity, and desired cooking times.

The main controller 507 controls the operation of the heating elements 71, 311, the valves 181, 295 of the water injection systems 171, 351, the cooling fans 541, the temperature sensors 75, 321 in the upper and lower cooking chambers 11, 225, the blower 281 in the lower chamber 225, and the humidity control system 393. The main controller 507 also works in cooperation with the blower controller 509 to control the speed and direction of the blower 61 circulating air through the upper chamber 11.

In particular, the main controller is programmable via the operator input 505 to operate the blower 61 according to a selected protocol to effect a desired cooking operation in the upper chamber 11. This protocol can be varied depending on the type of food being cooked, the quantity of food being cooked, the desired characteristics to be imparted to such food during cooking (e.g., crispness, extent of browning), and other factors. The main controller is responsive to operator input to communicate the appropriate blower speed and direction information to the blower controller 509 via communication lines designated 561 in FIG. 24. The blower controller 509 functions to drive the blower motor 101 at the desired speeds and in the desired direction or directions to operate the blower wheel 121 in a manner which provides the desired air flow to the upper cooking chamber 11. One controller 509 found to be suitable for this purpose is a programmable controller model J7 drive supplied by Yaskawa Electric America, Inc.

Figure 26A:
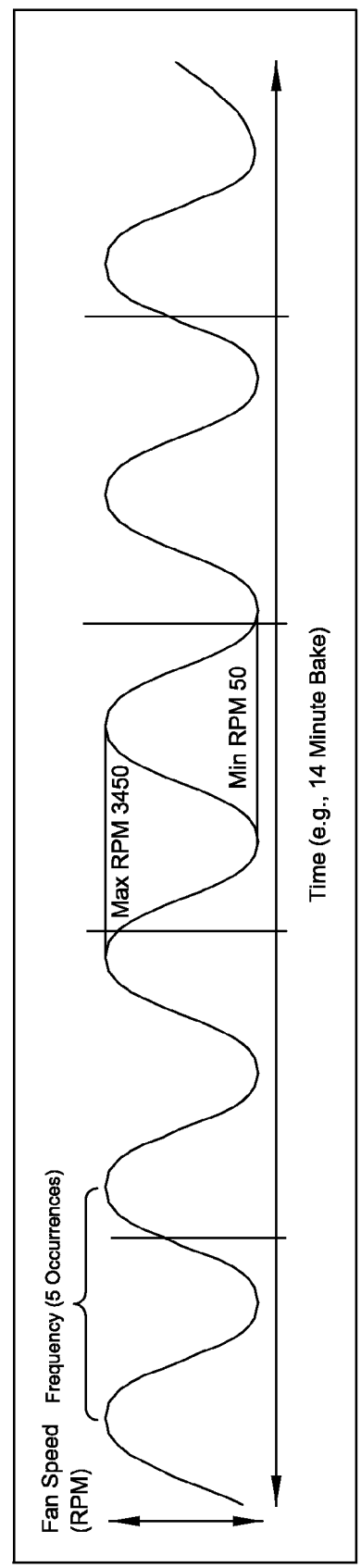
FIGS. 26A-26C are graphs showing various blower speed and direction protocols with differing frequencies of speed change.
Figure 26B:
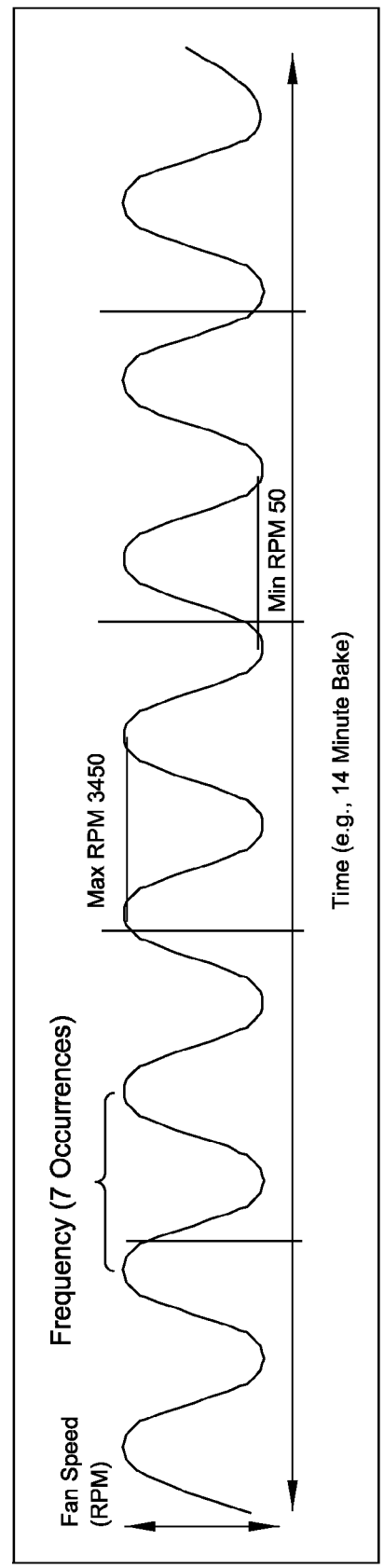
Figure 26C:
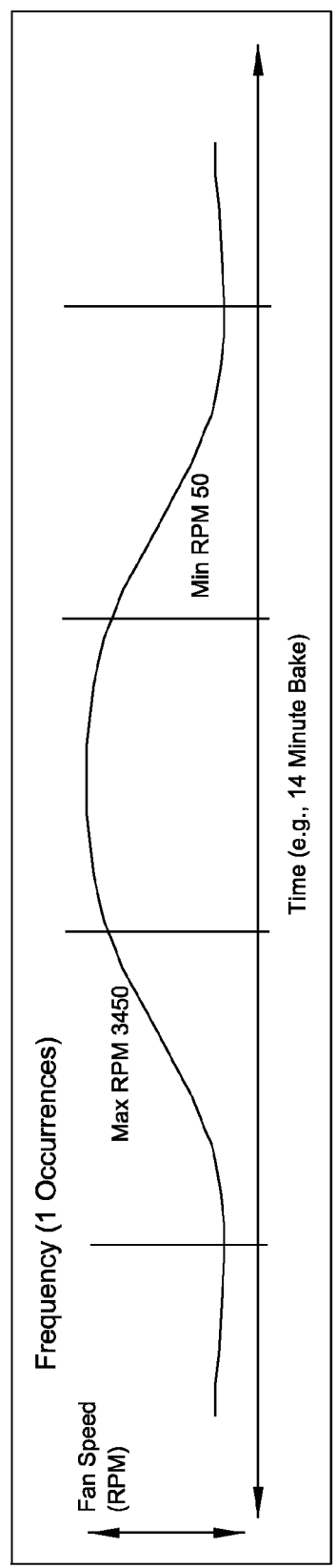
Figure 27:
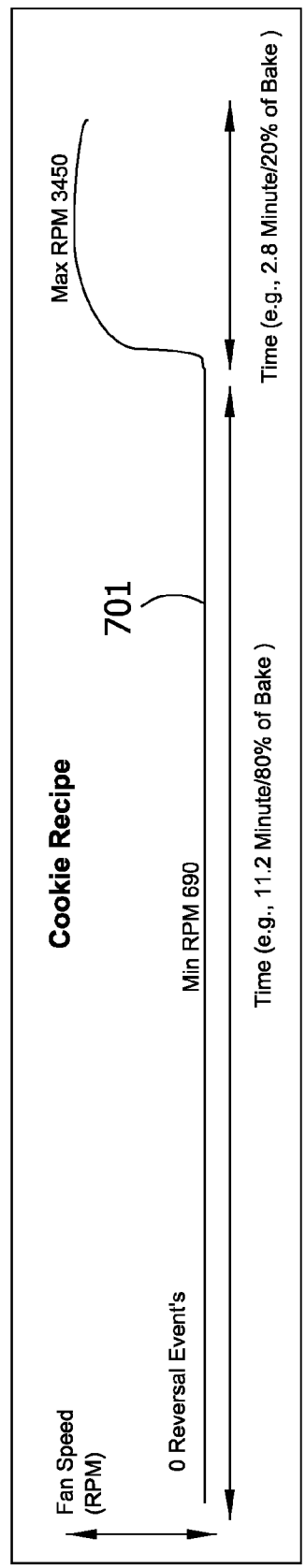
FIG. 27 is a graph showing a blower speed profile for a certain food product.

Examples of different blower protocols are illustrated in FIGS. 25-27. In general, each blower protocol involves changing the speed of the blower wheel 61 during a cooking event according to a non-linear speed curve, and optionally effecting one or more reversal events during the cooking event during which the rotational direction of the blower 61 is reversed. It has been found that operating the blower 61 at different speeds and periodically reversing its direction causes a corresponding change in the speed and direction of air circulating through the cooking chamber 11, and that a more uniform baking and browning of the food (e.g., bread) is achieved as a result.

Figure 25A:
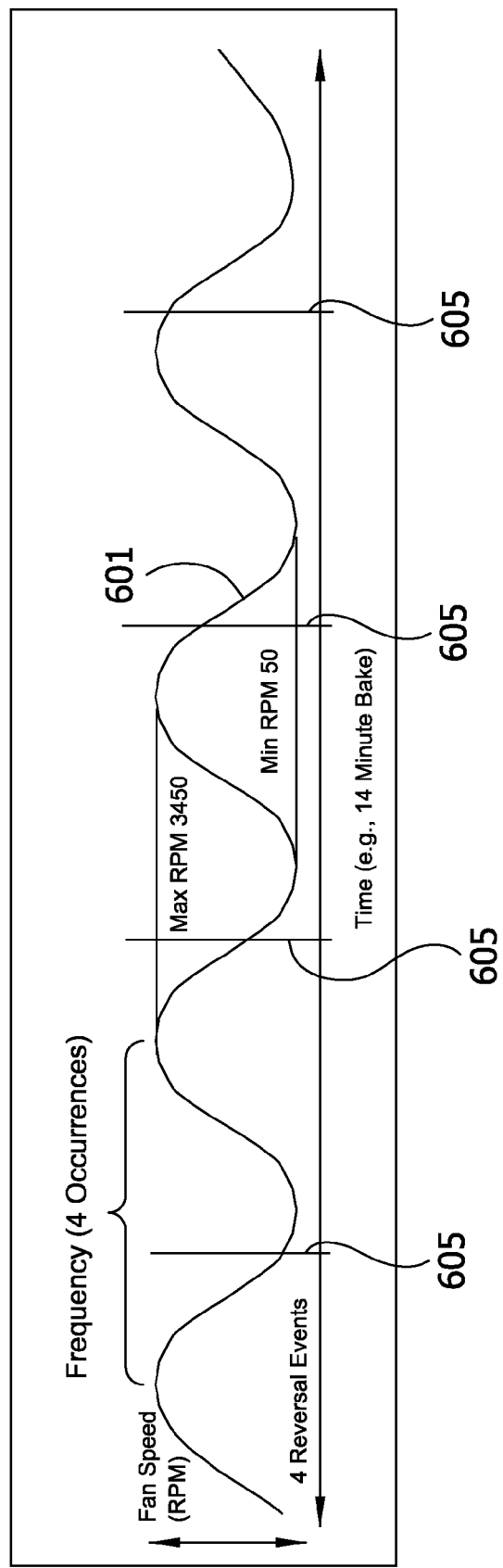
FIGS. 25A-25E are graphs showing various blower speed and direction protocols with differing numbers of blower reversal events.
Figure 25B:
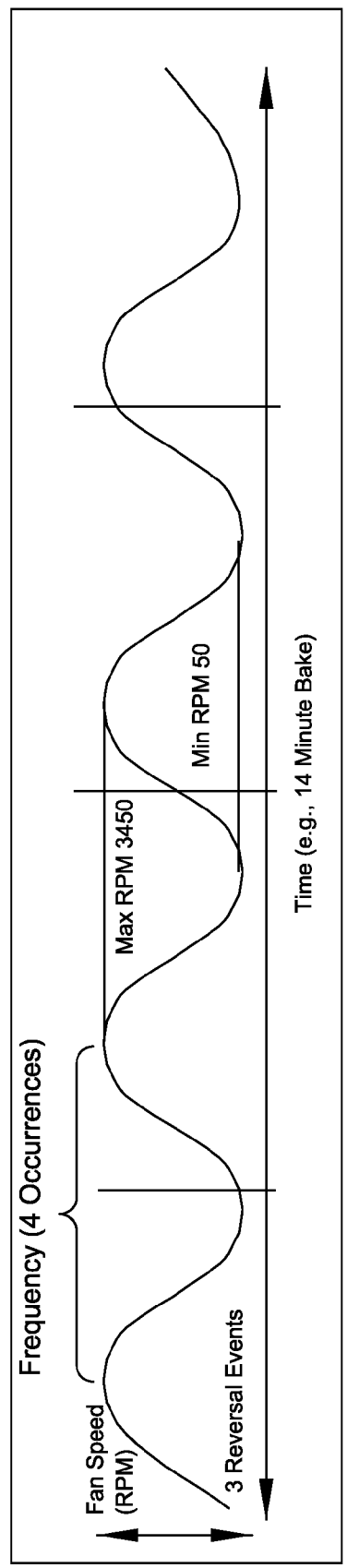
Figure 25C:
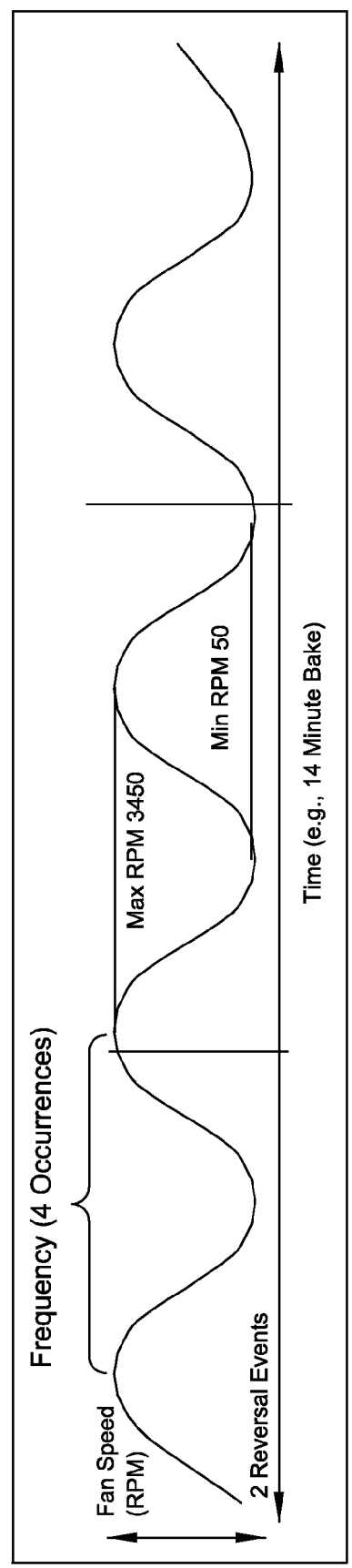
Figure 25D:
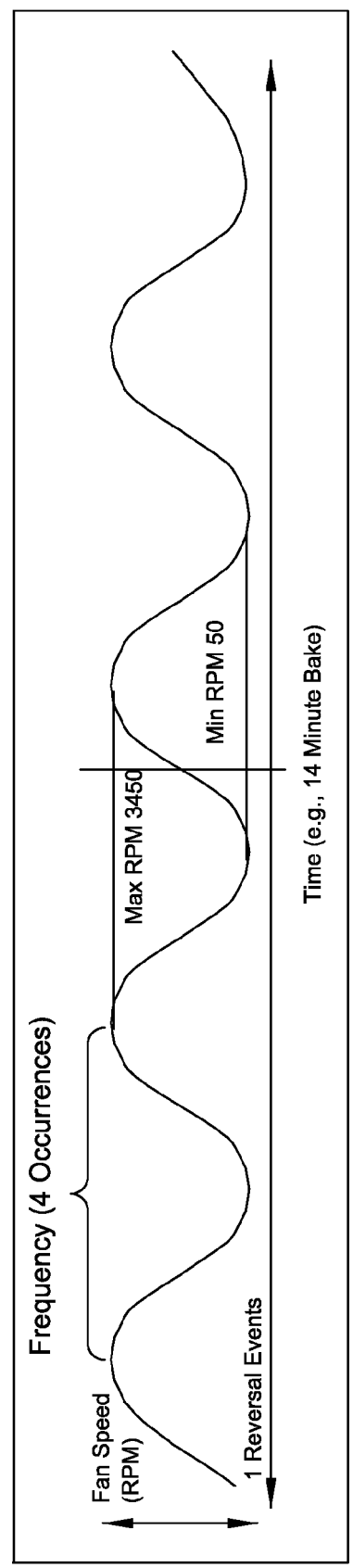
Figure 25E:
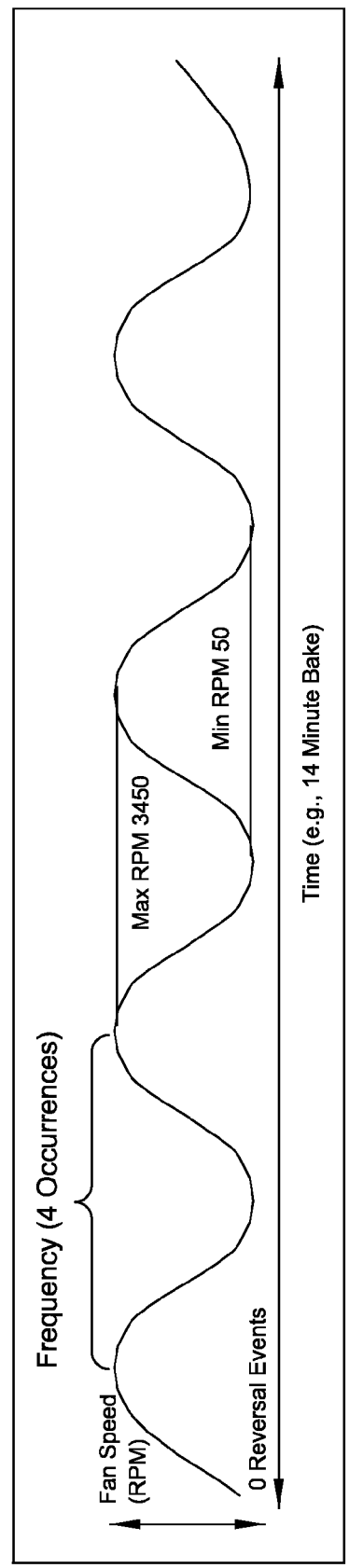

FIG. 25A is a graph showing a blower protocol in which the blower motor 101 is operated to rotate the blower wheel 121 during a cooking event of predetermined length (e.g., 14 minutes) and at rotational speeds which increase and decrease according to the illustrated speed curve 601. In this example, the curve resembles a sine wave, and the speed varies from a minimum of rpm of 50 to a maximum rpm of 3450 to circulate air through the upper cooking chamber 11 at velocities ranging from a minimum velocity of less than about 30 ft/min to a maximum velocity of no greater than about 600 ft/min, and more desirably to a maximum velocity in the range of 220-300 ft/min. Lower or higher speeds and velocities may alternatively be used. The rotational speed change repeats four times during the cooking event, i.e., the frequency is four changes per cooking (e.g., baking) event. Further, there are four direction reversal events occurring at intervals during the cooking event, as represented by the vertical lines 605 on the graph.

Each reversal event is started by a signal from the main controller 507 to the blower controller 509 to de-energize the blower motor 101 or otherwise cause it to decelerate as it rotates in one direction from a first rotational speed on the speed curve 601 to a zero rotational speed, followed by an acceleration of the blower motor as it rotates in an opposite direction from zero speed to a second rotational speed on the speed curve. The second speed may be substantially the same as the first speed or substantially different from the first speed, depending on the shape of the speed curve and the duration of the reversal event. In the latter regard, the duration of each reversal event will depend on the time it takes the blower wheel 121 to decelerate to zero and then to accelerate back up to speed in the opposite direction. The duration in one example is no greater than 30 seconds. The duration is more desirably no greater than 20 seconds, even more desirably no greater than 15 seconds, and still more desirably less than 10 seconds. The reversal events shown in FIG. 25A occur at regular intervals, but they can also occur at irregular intervals, depending on the desired cooking "recipe" to be followed.

In FIG. 25A, the shape of the speed curve 601 is non-linear between the end of one reversal event and the beginning of another reversal event. Further, the speed of the blower wheel 121 changes constantly or substantially constantly during the entire cooking event. That is, the speed curve is substantially non-linear or, in other words, has no substantial linear components. (As used herein, "substantially non-linear" and "no substantial linear components" means that the curve has no linear components lasting more than 45 seconds, or even more desirably no more than 30 seconds, or even more desirably no more than 20 seconds, or even more desirably no more than 10 seconds.) In other embodiments, the speed curve may have substantial linear components.

FIGS. 25B-25E show four additional blower protocols similar to FIG. 25A except that they include three, two, one and no reversal events, respectively. FIGS. 26A-26C show three additional blower protocols similar to FIG. 24 except that the speed change frequencies are five, six and one, respectively. The number of reversal events and the frequency of speed change can be varied as needed to achieve the desired baking results.

FIG. 27 shows a different blower protocol in which the blower 61 is operated to follow a speed curve 701 in which the blower rotates at a substantially constant and relatively low speed (e.g., 690 rpm) for a predetermined period (e.g., 80% of the bake event) and then ramps up to a higher speed (e.g., 3450 rpm) for the remainder of the baking event. This type of protocol has been found to be useful for certain food products such as cookies where frozen dough is placed in the baking oven and cooked. During the process, the dough is heated slowly at the lower air speeds so that the dough deforms slowly to the proper cookie shape. Once the dough has assumed the proper shape, the blower speed is increased to bake the dough more rapidly to provide the desired browning.

Other blower protocols may be used. By way of example but not limitation, the protocols shown in FIGS. 25 and 26 above may be modified such that the speed of the blower remains constant for one or more dwell (holding) intervals along the speed curve.

As will be described, the desired protocol can be programmed into the oven by the operator using the operator input 505. In particular, the operator input 505 is configured to enable an operator to select any combination of one or more of the following: cooking time, cooking temperature, number of water injection/steam generation events, maximum and minimum blower speed, frequency of speed change, and number of blower reversal events. In addition, or alternatively, the operator input 505 may be configured to enable an operator to select a type of food to be cooked, in response to which the main controller 505 automatically selects (i.e., is programmed to select without further operator input) a predetermined speed curve and number of reversal events for the cooking event.

The control system 501 desirably includes a USB host adapter 821 that enables connection of a USB memory storage device or flash drive (not shown) for various purposes. For example, end users may import recipes they have created or retrieved from a website or computer. Further, the USB host adapter 821 allows for training and maintenance information stored on a flash drive to be displayed, e.g., on the operator input 505, preferably in the form of a liquid crystal display touch screen (also numbered 505) mounted on the control panel 551. Such information may include instructions for baking bread or procedures for cleaning the oven 1. Information displayed on the screen 505 may include text, photographs/figures, and video. Maintenance personnel may also use the USB host adapter 821 to import various operating or firmware updates.

Figure 28:
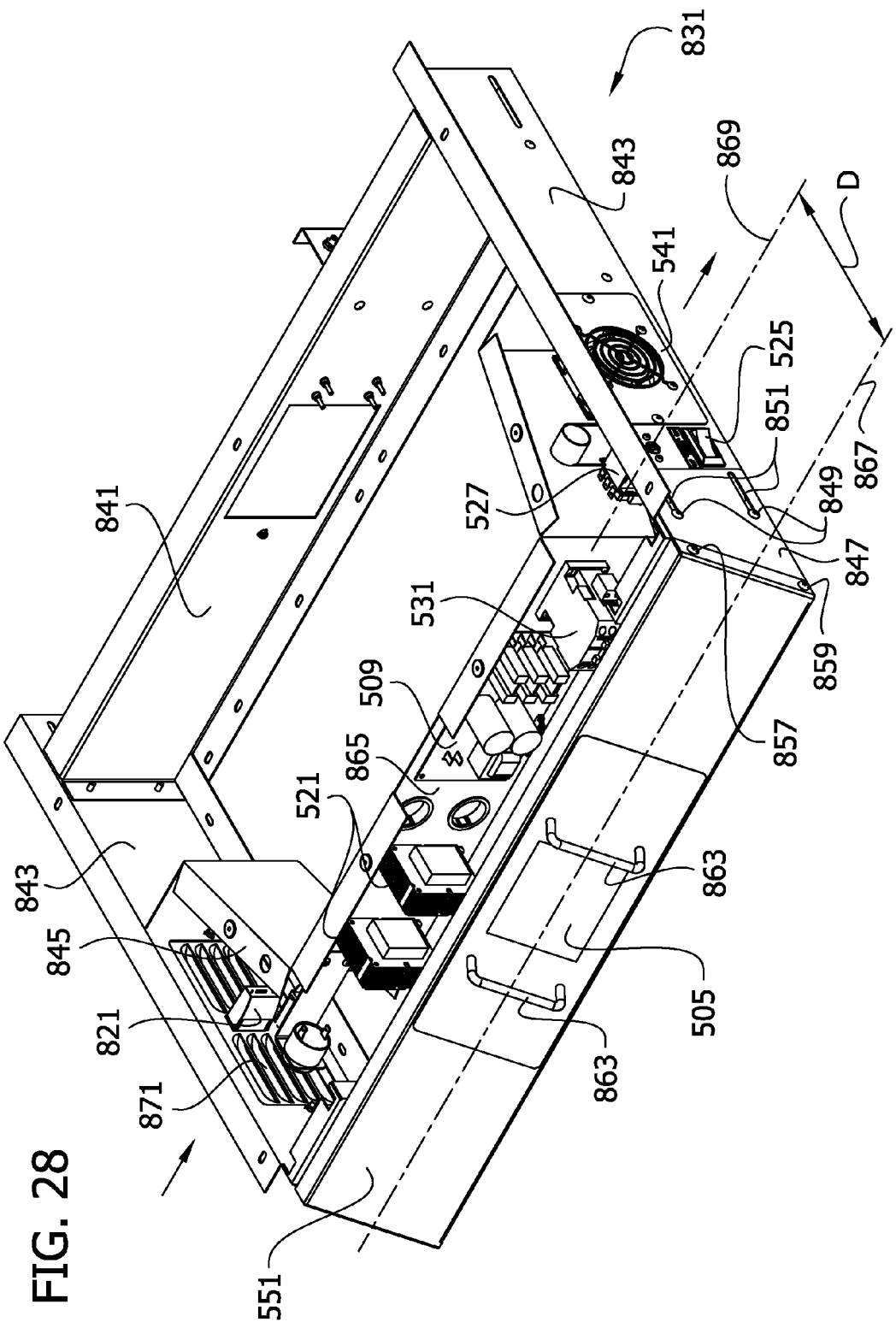
FIG. 28 is a perspective of a housing for housing electrical components of the oven.

FIGS. 28 and 29 show electrical components of the oven as described above housed in a housing 831 located between the upper and lower sections 5A, 5B of the oven (see FIG. 1). Electrical components as referred to herein include any electrical, electronic, or associated components. The housing 831 comprises a front wall forming, in the illustrated embodiment, a control panel 551, a back wall 841, and opposing side walls 843. A chassis 845 extends between the side walls 843 at a location forward of the back wall 841. The chassis 845 is desirably secured by rivets or screws to respective side walls 843, to the bottom wall of upper oven section 5A, and to the upper wall of lower oven section 5B. The control panel 551 is mounted on two slide rails 847 having slide connections with the side walls 843 of the housing 831. In the illustrated embodiment, each slide connection between a rail 847 and respective side wall 843 comprises two screws 849 extending through horizontal elongate slots 851 in the slide rail 847 and threaded into a respective side wall 843. The control panel 551 is connected to the slide rails 847 at the sides of the control panel by two upper screws 857 and two lower screws 859.

Figure 29A:
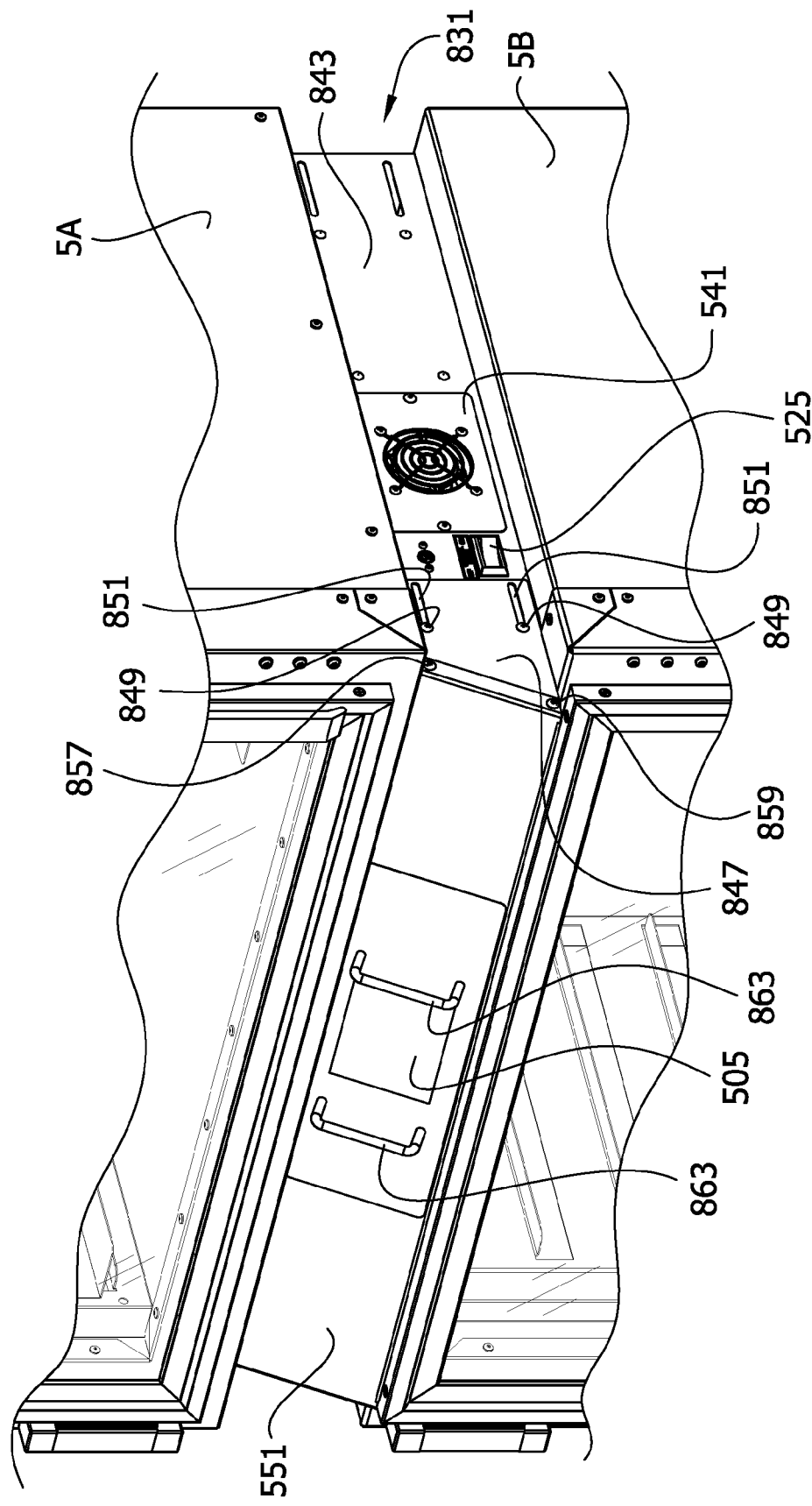
FIGS. 29A-29C are sequential perspectives of the housing of FIG. 28 showing a wall of the housing moved from a closed position to an open position.
Figure 29B:
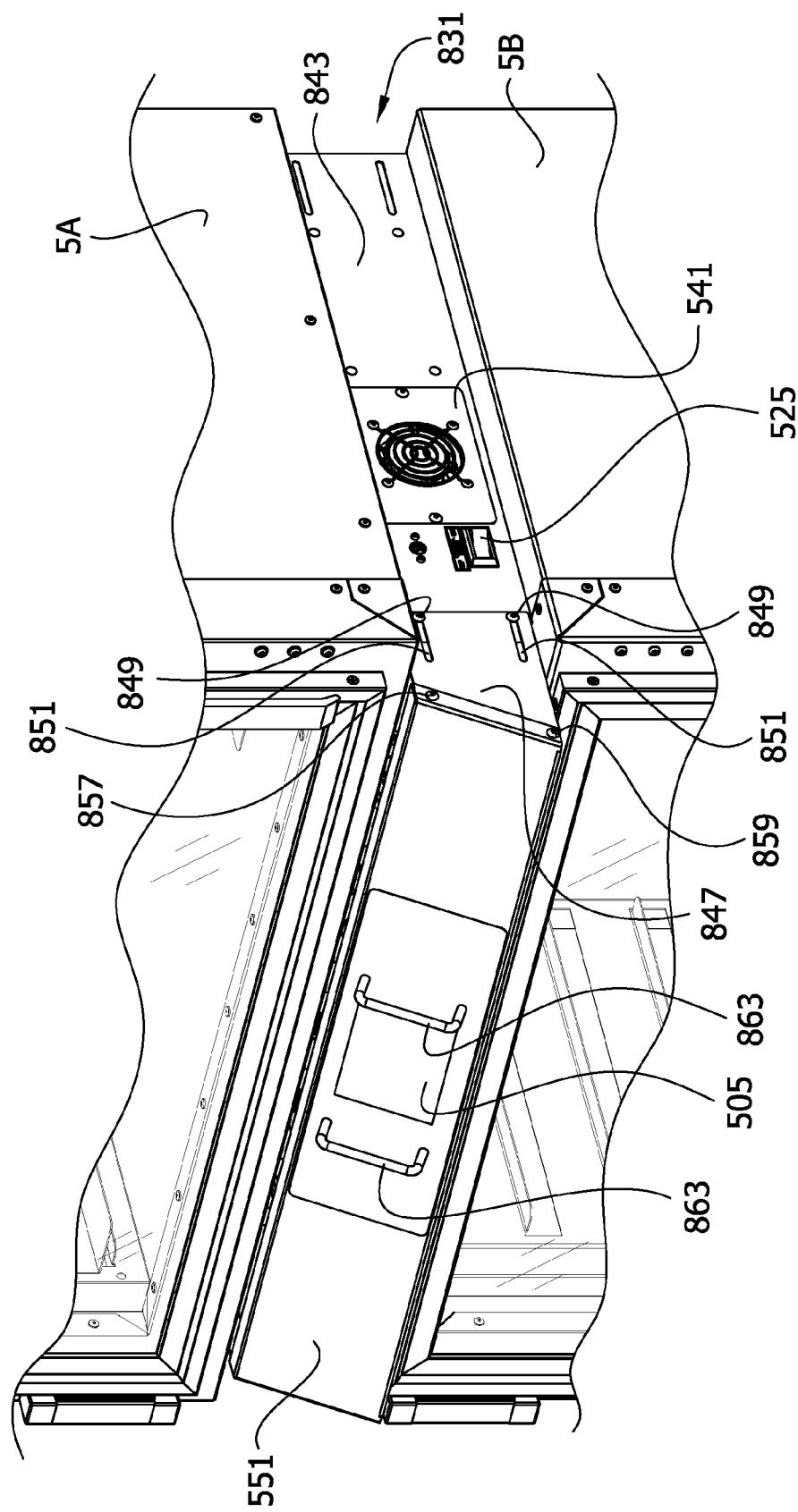
Figure 29C:
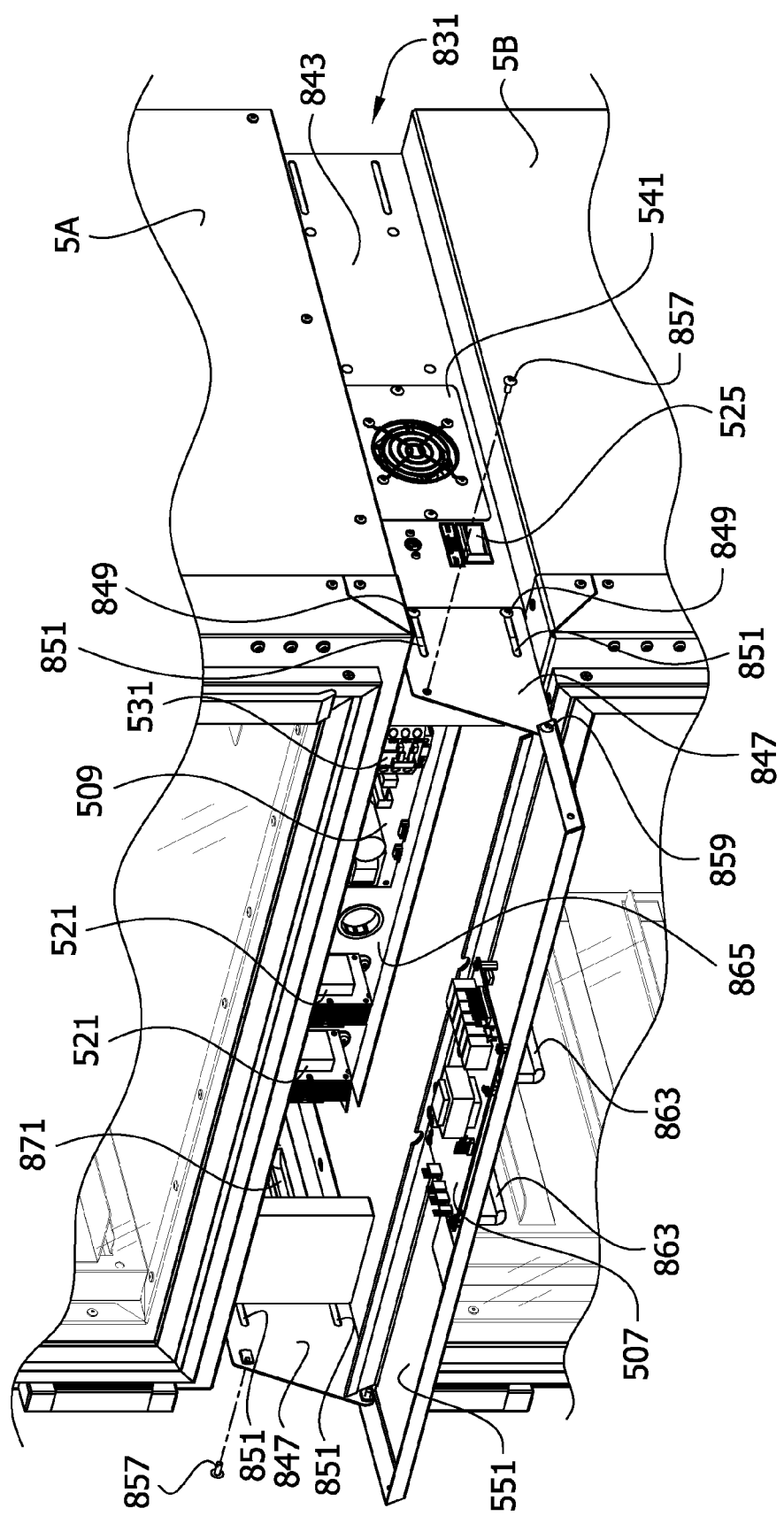

As shown sequentially in FIGS. 29A-29C, the control panel 551 may be opened to provide convenient access to the various electrical components mounted within the housing 831. In a closed or upright position, as shown in FIG. 29A, the electrical components are concealed within the housing 831. To open the control panel 551, the screws 849 holding the slide rails to side walls are loosened. Handles 863 on the control panel 551 may then be used to pull the control panel forward, or in a direction away from the back wall 841, until the screws 849 through the slide rail slots 851 stop further forward movement of the slide rails 847, as shown in FIG. 29B. The upper screws 857 connecting the control panel 551 to the slide rails 847 are then removed, allowing the control panel to be pivoted about an axis extending between the two lower screws 859. In the open or hang-down position, as shown in FIG. 29C, the electrical components mounted within the housing 831 are exposed for convenient access and servicing. For example, the components mounted on the back side of the control panel 551, including the main controller 507 and associated components, are readily accessible. The components mounted on the side walls 843, including for example the main breaker switches 525, high-limit thermostat 527 and USB host adapter 821, are also readily accessible. Further, the components mounted on the chassis 845, including for example the transformers 521, contactor device 531 and blower speed/direction controller 509, are conveniently exposed and oriented in a position for convenient access. Without the chassis 845, electrical components would need to be mounted on, e.g., the back wall 841 or the top wall of the lower section 5B.

The chassis 845 provides a vertical mounting surface forward of the back wall 841 and spaced relative to the control panel 551 in its closed position to locate the electrical components mounted on the chassis in a position where an operator may conveniently view, access and service the components when the control panel is open. A primary mounting surface 865 of the chassis 845 is located with respect to the control panel 551 in its closed position to provide clearance between the electrical components mounted on the chassis and back side of the control panel, and to position the components mounted on the chassis conveniently close to the opening created when the control panel is open. In the illustrated embodiment, the control panel 551 is disposed at an angle from the vertical plane (e.g., 5 to 90 degrees, or more desirably 10 to 70 degrees, or even more desirably 10-30 degrees) for convenience of use and best view of the operator input 505 (e.g., liquid crystal display touch screen). However, the control panel 551 may be disposed in a generally vertical orientation. Whether the control panel 551 is disposed at an angle or in a generally vertical orientation, the distance between the control panel and the primary mounting surface 865 of the chassis 845 is desirably between 2 and 15 in., more desirably between 4 and 12 in., and even more desirably between 5 and 9 in. The distance as used herein means the distance D in FIG. 28 as measured from the vertical centerline 867 of the front wall 551 in its closed position and the vertical centerline 869 of the primary mounting surface 865 of the chassis 845. This spacing enables service personnel to conveniently access components mounted on the primary mounting surface 865 of the chassis 845 with standard tools, such as a screwdriver with an 8 in. shaft and blade. The primary mounting surface 865 is desirably positioned no further than 10 in. from the back side of the control panel 551 in its closed position to enable service personnel to use standard tools. The spacing also allows for clearance between the mounted components such that wires connecting the components are not pinched or bent and a minimum clearance is provided for flow of cooling air between the components. Other spacing arrangements than those mentioned above may be used.

The chassis 845 also serves to create a more efficient flow path for cooling air across the electrical components mounted within the housing 831, the cooling flow path being defined by the space between the chassis and the front wall 551. The components are cooled by relatively cool air pulled by the cooling fan 541 through an inlet 871 in the side wall 843. The chassis 845 is configured to decrease the area of the flow path. Thus, less air is required to effectively cool the components, and one relatively small cooling fan 541 may be used rather than two or more fans. Desirably, air pulled by the cooling fan 541 does not pass through the space between the chassis 845 and the back wall 841.

Figure 31:
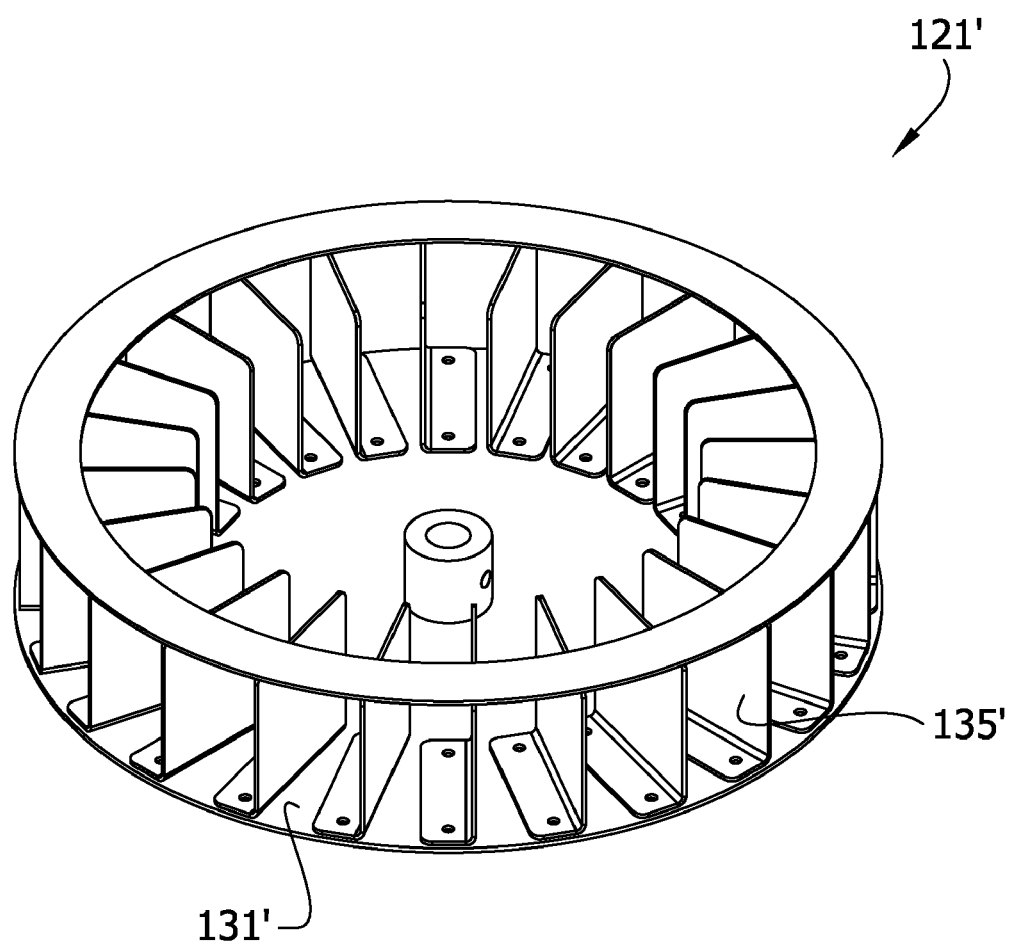
FIG. 31 is a perspective view a blower wheel of the blower shown in FIG. 30.
Figure 32:
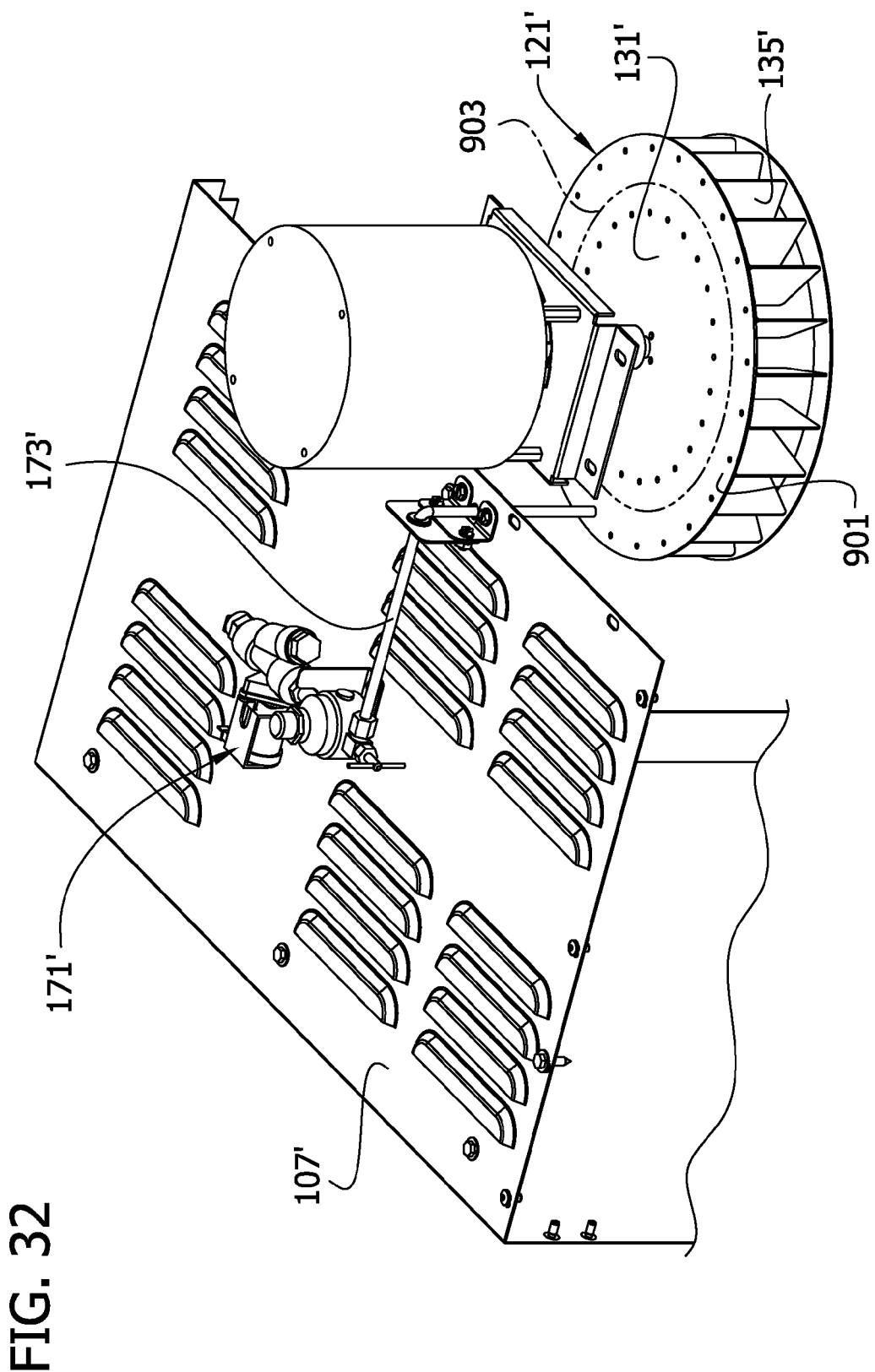
FIG. 32 is a view illustrating the steam generation/water injection system of FIG. 30.

FIGS. 30-32 illustrate another embodiment of a blower wheel, generally designated 121', for circulating gas through the cooking chamber 11', and a steam generation and water injection system, generally designated 171', for delivering water to the heated blower wheel 121' for dispersion into the upper portion 53a' of the air conduit system 53. The blower wheel 121' and the water injection system 171' are similar in many respects to the blower wheel 121 and water injection system 171 described above, and corresponding parts are designated by the corresponding reference numbers, plus a prime designator ('). In this embodiment, an even number of blades 135' are used to enhance balance of the blower wheel 121', and fewer blades are used, creating more space between the blades. The blades 135' do not have water-dispersion formations for dispersing water into the cooking chamber like the water-dispersion formations 151 of the blower wheel 121. Water dispersion formations are not necessary in this embodiment because the water injection system 171' delivers water to a different location on the blower wheel 121'. In this embodiment, as shown in FIGS. 30 and 32, the components of the injection system 171' are mounted on the top wall 107' of the oven at a location where the injector 173' extends from the top wall down to a position for delivering water for impact against the rotating and heated upper wheel member 131' which, in this embodiment, comprises a circular plate (also designated 131'). Heating of the blower wheel 121' (and thus the upper wheel member 131') is accomplished by circulating hot gas (e.g., air) from the cooking chamber 11' over the surfaces of the blower wheel, which raises the temperature of the blower wheel surfaces above the boiling point of water for steam generation. By way of example, the injector may be spaced about 0.25 in. above the circular plate 131'. As a result, water is injected onto the upward facing upper surface of the circular plate 131', where much of the water flashes to steam and is then dispersed into the cooking chamber 11' through the air conduit system 53. Water that does not flash to steam slides to the outside perimeter of the plate 131', as a result of the rotation of the plate, and is dispersed in the form of small droplets across the heating elements 71' and onto the walls within the air conduit system 53, such as the side walls 47 or back wall 51. Water droplets that do not initially change to steam slide down the walls 47, 51 to the bottom wall 45, where the water is then evaporated into steam vapor.

The embodiment including the blower wheel 121' and the water injection system 171' provides several advantages, such as: more efficient steam generation; shielding of water droplets from contacting food product in the cooking chamber 11; and less noise generation. The present embodiment generates steam more efficiently because the water injection system 171' delivers water for impact against the upper surface of the rotating upper wheel member 131'. The water remains in contact with the upper surface of the wheel member 131' for a longer period of time than it would if injected against the blades 135', and the upper wheel member 131' has a relatively large surface area (approximately 155 square inches in one embodiment). Thus, the upper wheel member 131' imparts more efficient heat transfer to the water, flashes the water to steam more effectively, and decreases the amount of water leaving the blower wheel 121' without flashing to steam. The present embodiment also shields water droplets from the water injection system 171' from entering the cooking chamber 11' through the exhaust 69' and undesirably affecting the cooking process. Introduction of water to the suction side 121a' or even the output side 121b' of the blower wheel 121 may allow water droplets that do not flash to steam to enter the cooking chamber 11' through the exhaust 69' and contact the food product in the cooking chamber. In the present embodiment, water that does not flash to steam when it contacts the upper surface of the upper wheel member 131' slides to the outside perimeter of the plate and is dispersed onto the walls within the air conduit system 53, such as the side walls 47 or back wall 51. Thus, water that does not flash to steam is moved away from the exhaust 69' to avoid contact with the food product in the cooking chamber 11'. As shown in FIG. 32, water generally contacts the circular plate 131' in the annular region 901, which has no holes through which liquid can pass. The annular region 901 is bounded by the phantom circular line designated 903 and by the outside perimeter of the plate. The phantom circular line 903 is concentric with the axis of rotation of the plate 131' and has a radius less than the distance from the center of the plate to the location on the plate over which the injector 173' is mounted. Further, the present embodiment results in less noise generation because the water impacting the circular plate 131' creates less noise than if the water were impacting the rotating blades 135' or water-dispersion formations 151 (FIG. 3).

Figure 33:
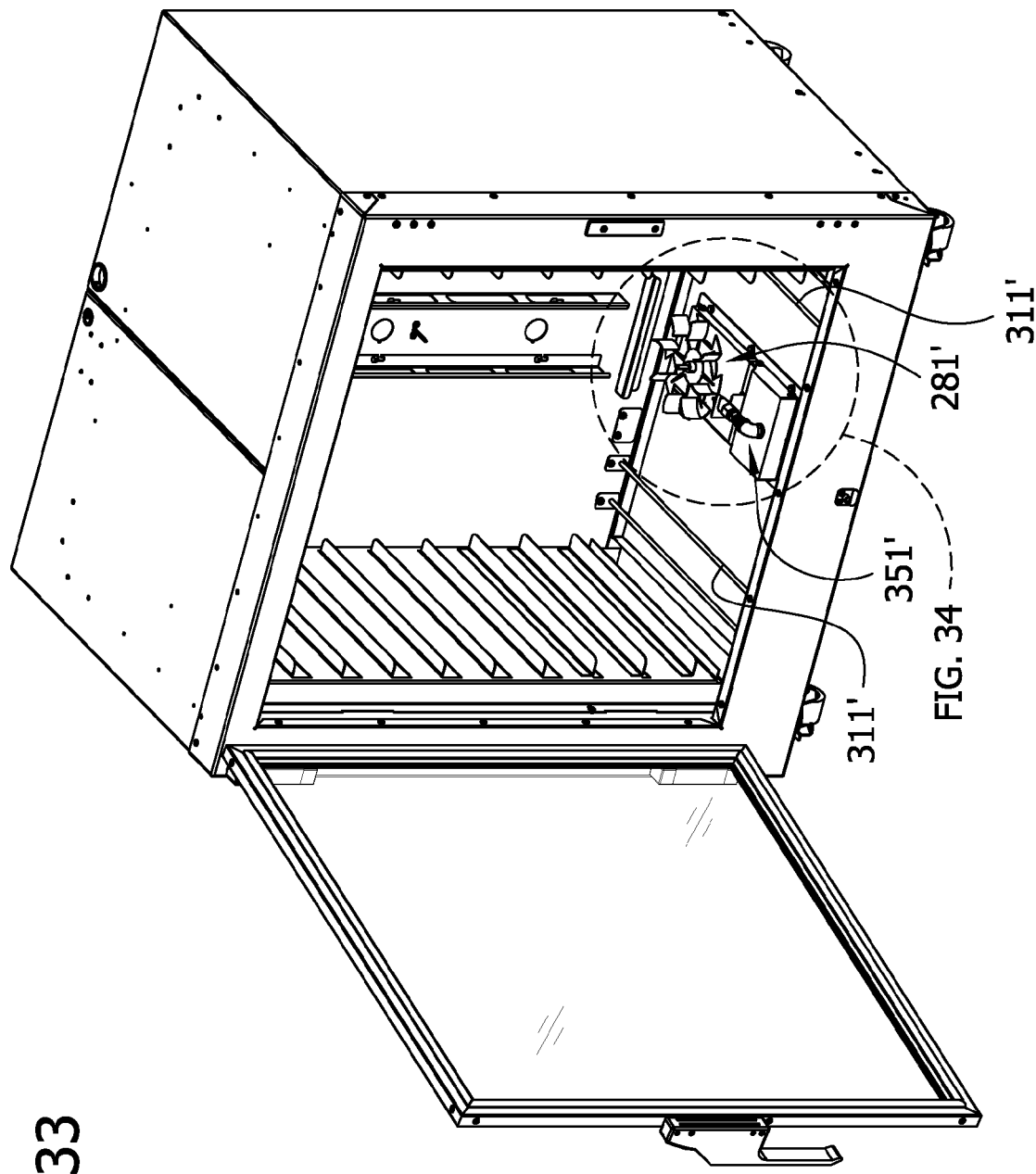
FIG. 33 is a perspective of another embodiment of the lower section of the oven with the door open and the bottom wall of the cooking chamber removed to show details.
Figure 34:
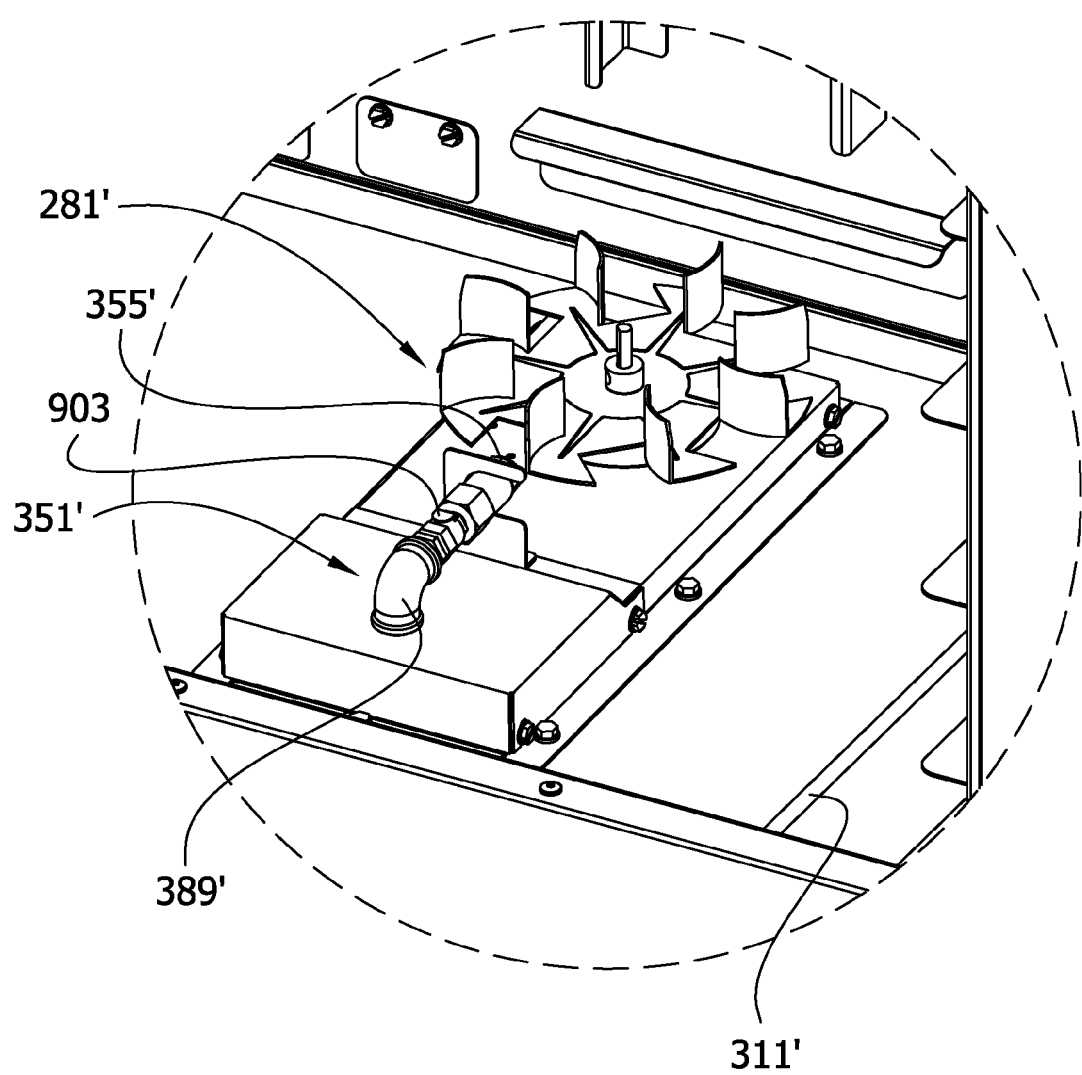
FIG. 34 is an enlarged portion of FIG. 33 showing details of the blower and water injection system.

FIGS. 33-34 illustrate, in the lower section 5B of the oven 1, another embodiment of a blower wheel, generally designated 281', for circulating gas through the cooking chamber 225, and a water injection system, generally designated 351', for delivering atomized water to the blower wheel 281' for dispersion into the air conduit system 271. The blower wheel 281' and the water injection system 351' are similar in many respects to the blower wheel 281 and water injection system 351 described above, and corresponding parts are designated by the corresponding reference numbers, plus a prime designator ('). In this embodiment, the blower wheel 281' lacks the "squirrel cage" included on the blower wheel 281. The water injection system of this embodiment includes a quick-release connection between the supply line 389' and the injector 355'. A tab 903 at the end of the supply line 389' is provided for disconnecting the injector 355', which has an O-ring for creating a fluid-tight seal between the injector and the supply line. In this embodiment, the heating elements 311' are located in different positions in the air conduit system 271 below the bottom wall 229.

Having described the invention in detail, it will be apparent that modifications and variations are possible without departing from the scope of the invention defined in the appended claims. In this regard, it will be understood that an oven of this invention may have different cooking chamber configurations. By way of example, the oven may have only one baking chamber 11 and no proofing chamber 225; or the oven may have two or more baking chambers 11 stacked one on top of another with no proofing chamber; or the oven may have one baking chamber and two proofing chambers. Other combinations are possible.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A convection oven comprising a cooking chamber for receiving food to be cooked, said cooking chamber being defined by opposite side walls, a back wall, and a door which closes an open front of the cooking chamber, said cooking chamber having a width extending between the side walls and a depth extending between the door and the back wall, a blower for circulating gas through the cooking chamber,
a heater for heating the gas,
a housing for housing electrical control components of the oven, the housing comprising front, back, top, bottom, and side walls, the front wall being movable relative to the cooking chamber from a first position in which the electrical components are concealed within the housing to a second position in which the electrical components are exposed, the electrical components being mounted within the housing at positions relative to the front wall such that the electrical components may be accessed by an operator when the front wall is in the second position, a chassis positioned within the housing, the chassis including a generally vertical mounting surface mounting one or more of said electrical components of the oven, the chassis being disposed within the housing forward from the back wall of the housing and relative to the front wall of the housing such that electrical components mounted on the chassis may be accessed by an operator when the front wall is in the second position, the generally vertical mounting surface of the chassis extending widthwise of the cooking chamber and facing forward toward the front wall when the front wall is in the first position, and an operator input on the front wall of the housing for inputting information to said electrical control components.

2. A convection oven as set forth in claim 1 further comprising a fan mounted on said housing for moving air through said housing along a path between the front wall of the housing and the chassis to cool said electrical components.

3. A convection oven as set forth in claim 1 wherein the generally vertical mounting surface is spaced 2 to 15 inches from the front wall when the front wall is in the first position.

4. A convection oven as set forth in claim 1 wherein the generally vertical mounting surface is spaced no more than 10 inches from the front wall when the front wall is in the first position.

5. A convection oven as set forth in claim 1 wherein the front wall is movable to the second position by sliding of the front wall generally away from the back wall and pivoting of the front wall.

6. A convection oven as set forth in claim 5 wherein said front wall is connected to respective side walls of the housing by slide connections which include slide rails, and wherein said front wall is mounted adjacent forward ends of the slide rails for pivotal movement from an upright position to a lowered position in which the front wall is pivoted downward with respect to the slide rails.

7. A convection oven as set forth in claim 6 further comprising a proofing chamber below said cooking chamber, and wherein said housing is located between said cooking and proofing chambers.

8. A convection oven as set forth in claim 1 wherein one or more of said electrical components of the oven are mounted on a back side of the front wall of the housing.

9. A convection oven as set forth in claim 1 wherein said operator input comprises a liquid crystal display touch screen.

10. A convection oven as set forth in claim 1 wherein the front wall is movable independent from the chassis.

11. A convection oven as set forth in claim 10 wherein the chassis is fixed to the bottom wall of the housing.

12. A convection oven as set forth in claim 1 wherein when the front wall is in the first position the front wall is disposed at an angle between 10 to 70 degrees from vertical.

13. A convection oven comprising
a cooking chamber for receiving food to be cooked,
a blower for circulating gas through the cooking chamber,
a heater for heating the gas,
a housing for housing electrical control components of the oven, the housing comprising front, back, top, bottom, and side walls, the front wall being connected to the side walls by exterior slide connections outside the housing, the slide connections permitting the front wall to move in a direction generally away from the back wall of the housing, the front wall being movable from a first position in which the electrical components are concealed within the housing to a second position in which the electrical components are exposed, the electrical components being mounted within the housing at positions relative to the front wall such that the electrical components may be accessed by an operator when the front wall is in the second position, and
an operator input on the front wall of the housing for inputting information to said electrical control components.

14. A convection oven as set forth in claim 13 wherein the slide connections each include a slide rail, the slide rail being positioned exterior of the outer surfaces of the respective side walls of the housing and being movable along the side walls of the housing for permitting the front wall to move in said direction generally away from the back wall of the housing.

15. A convection oven as set forth in claim 14 wherein each slide rail includes an elongate slot and each slide connection further comprises a fastener extending through the elongate slot, the fastener serving as a stop for limiting movement of the front wall in said direction generally away from the back wall of the housing.

16. A convection oven as set forth in claim 15 wherein each fastener has a loosened state in which the respective slide rail is permitted to slide with respect to the housing and a tightened state in which the respective slide rail is held against sliding movement with respect to the housing.

17. A convection oven as set forth in claim 14 wherein a lower end of the front wall has pivot connections to the side rails adjacent forward ends of the slide rails for pivotal movement from an upright position to a lowered position in which the front wall is pivoted downward with respect to the slide rails.

18. A convection oven as set forth in claim 17 wherein the front wall in said first position has releasable connections above the pivot connections holding the front wall from pivoting about the pivot connections, the releasable connections when released permitting the front wall to pivot about the pivot connections from said first position to said second position.

19. A convection oven as set forth in claim 18 further comprising a chassis positioned within the housing, the chassis including a generally vertical mounting surface mounting one or more of said electrical components of the oven, the chassis being disposed within the housing forward from the back wall and relative to the front wall such that electrical components mounted on the chassis may be accessed by an operator when the front wall is in the second position, the generally vertical mounting surface of the chassis facing forward toward the front wall when the front wall is in the first position.

20. A convection oven as set forth in claim 13 wherein when the front wall is in the first position the front wall is disposed at an angle between 10 to 70 degrees from vertical.

* * * * *